(12) United States Patent
Fanselow et al.

(10) Patent No.: US 7,517,455 B2
(45) Date of Patent: Apr. 14, 2009

(54) LIQUID-LIQUID EXTRACTION SYSTEM AND METHOD

(75) Inventors: Dan L. Fanselow, White Bear Lake, MN (US); Todd W. Johnson, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 407 days.

(21) Appl. No.: 11/468,040

(22) Filed: Aug. 29, 2006

(65) Prior Publication Data

US 2006/0283800 A1    Dec. 21, 2006

Related U.S. Application Data

(62) Division of application No. 10/388,099, filed on Mar. 13, 2003, now Pat. No. 7,105,089.

(51) Int. Cl.
B01D 11/04    (2006.01)
B01D 63/00    (2006.01)

(52) U.S. Cl. .................... 210/644; 210/649; 210/650

(58) Field of Classification Search .................. None
See application file for complete search history.

(56) References Cited

U.S. PATENT DOCUMENTS

| | | | |
|---|---|---|---|
| 3,332,746 A | 7/1967 | Claff et al. |
| 3,428,553 A | 2/1969 | Shiah |
| 3,796,313 A | 3/1974 | Bigt et al. |
| 3,801,404 A | 4/1974 | Druin et al. |
| 3,839,516 A | 10/1974 | Williams et al. |
| 3,843,761 A | 10/1974 | Bierenbaum et al. |
| 3,872,014 A | 3/1975 | Schell |
| 3,933,647 A | 1/1976 | Müller |
| 3,956,112 A | 5/1976 | Lee et al. |

| | | | |
|---|---|---|---|
| 4,055,696 A | 10/1977 | Kamada et al. |

(Continued)

FOREIGN PATENT DOCUMENTS

CA    2003539    5/1991

(Continued)

OTHER PUBLICATIONS

Wucherpfennig et al., "Production of wines with the alcohol removed under special consideration of the dialysis method", Die Weinwirtschaft, Technik 9-12, Sep. 1986, pp. 346-354 (With English Translation).

(Continued)

*Primary Examiner*—Krishnan S Menon
(74) *Attorney, Agent, or Firm*—Bradford B. Wright

(57) ABSTRACT

A method of extracting ethanol from a feed solution using a liquid-liquid extraction system including an outer chamber and an inner chamber. The outer chamber is adapted to contain one of a feed solution and a liquid extractant and defines a containment region. The inner chamber is adapted to contain the other of the feed solution and the liquid extractant within a lower portion of the inner chamber. The inner chamber is defined by a microporous membrane sleeve that internally maintains a frame. Upon final assembly, at least the lower portion of the inner chamber is positioned within the containment region of the outer chamber such that the microporous membrane sleeve establishes an extraction interface between contents of the inner and outer chambers.

8 Claims, 18 Drawing Sheets

U.S. PATENT DOCUMENTS

| | | | |
|---|---|---|---|
| 4,251,231 A | 2/1981 | Baird |
| 4,255,376 A | 3/1981 | Soehngen |
| 4,257,997 A | 3/1981 | Soehngen et al. |
| 4,276,179 A | 6/1981 | Soehngen |
| 4,298,693 A | 11/1981 | Wallace |
| 4,306,884 A | 12/1981 | Roth |
| 4,340,475 A | 7/1982 | Kraus et al. |
| 4,369,112 A | 1/1983 | Vincent et al. |
| 4,399,000 A | 8/1983 | Tedder |
| 4,405,688 A | 9/1983 | Lowery et al. |
| 4,441,891 A | 4/1984 | Roth |
| 4,510,242 A | 4/1985 | Tedder |
| 4,517,298 A | 5/1985 | Tedder |
| 4,520,213 A | 5/1985 | Victor |
| 4,532,347 A | 7/1985 | Vaughan |
| 4,581,236 A | 4/1986 | Bandel et al. |
| 4,617,127 A | 10/1986 | Light |
| 4,692,432 A | 9/1987 | Tedder |
| 4,717,482 A | 1/1988 | Light |
| 4,726,938 A | 2/1988 | Rollat et al. |
| 4,726,989 A | 2/1988 | Mrozinski |
| 4,778,688 A | 10/1988 | Matson |
| 4,789,468 A | 12/1988 | Sirkar |
| 4,865,973 A | 9/1989 | Kollerup et al. |
| 4,921,612 A | 5/1990 | Sirkar |
| 4,925,562 A | 5/1990 | te Hennepe et al. |
| 4,933,198 A | 6/1990 | Lee et al. |
| 4,966,707 A | 10/1990 | Cussler et al. |
| 4,973,434 A | 11/1990 | Sirkar et al. |
| 4,976,867 A | 12/1990 | Callahan et al. |
| 4,997,569 A | 3/1991 | Sirkar |
| 5,036,005 A | 7/1991 | Tedder |
| 5,084,220 A | 1/1992 | Møller |
| 5,096,584 A | 3/1992 | Reddy et al. |
| 5,114,582 A | 5/1992 | Sandstrom et al. |
| 5,120,594 A | 6/1992 | Mrozinski |
| 5,120,900 A | 6/1992 | Chen et al. |
| 5,215,902 A | 6/1993 | Tedder |
| 5,238,623 A | 8/1993 | Mrozinski |
| RE34,828 E | 1/1995 | Sirkar |
| 5,385,647 A | 1/1995 | Brueschke et al. |
| 5,449,457 A | 9/1995 | Prasad |
| 5,482,625 A | 1/1996 | Shimizu et al. |
| 5,512,180 A | 4/1996 | Ho |
| 5,580,452 A | 12/1996 | Lin |
| 5,620,605 A | 4/1997 | Møller |
| 5,626,752 A | 5/1997 | Mohn et al. |
| 5,632,946 A | 5/1997 | Bacon, Jr. et al. |
| 5,711,882 A | 1/1998 | Hofmann et al. |
| 5,714,072 A | 2/1998 | Reed et al. |
| 5,961,832 A | 10/1999 | Shaw et al. |
| 6,077,436 A | 6/2000 | Rajnik et al. |
| 6,086,769 A | 7/2000 | Kilambi et al. |
| 6,306,305 B1 | 10/2001 | Harper |
| 6,656,362 B1 | 12/2003 | Kihara et al. |
| 7,105,089 B2 | 9/2006 | Fanselow et al. |
| 7,122,709 B2 | 10/2006 | Fanselow et al. |
| 7,316,780 B1 | 1/2008 | Fendya et al. |
| 2007/0119771 A1 | 5/2007 | Schukar et al. |

FOREIGN PATENT DOCUMENTS

| | | |
|---|---|---|
| EP | 0 246 065 A1 | 11/1987 |
| EP | 0 324 922 A2 | 7/1989 |
| EP | 0 418 063 A1 | 3/1991 |
| EP | 0 480 567 A1 | 4/1992 |
| EP | 0 508 646 A1 | 10/1992 |
| EP | 0 662 341 A1 | 7/1995 |
| EP | 0 771 585 A2 | 5/1997 |
| EP | 1 022 052 A2 | 7/2000 |
| GB | 1 555 713 | 11/1979 |
| JP | 62-79808 | 4/1987 |
| JP | 63-209704 | 8/1988 |
| JP | 63-80802 | 11/1988 |
| JP | 06-210144 | 8/1994 |
| JP | 06-277463 | 10/1994 |
| JP | 06-327946 | 11/1994 |
| JP | 07-194933 | 8/1995 |
| JP | 07-313847 | 12/1995 |
| JP | 08-131783 | 5/1996 |
| JP | 08-155278 | 6/1996 |
| JP | 09-029076 | 2/1997 |
| JP | 09-57070 | 3/1997 |
| JP | 09-299947 | 11/1997 |
| JP | 11-207337 | 8/1999 |
| WO | WO 92/03216 | 3/1992 |
| WO | WO 93/23150 | 11/1993 |
| WO | WO 96/12541 | 5/1996 |
| WO | WO 01/09042 A1 | 2/2001 |
| WO | WO 2004/082812 A1 | 9/2004 |

OTHER PUBLICATIONS

Roddy, "Distribution of Ethanol—Water Mixtures to Organic Liquids", Ind. Eng. Chem. Process Des. Dev., vol. 20, No. 1, 1981, pp. 105-108.

Munson et al., "Factors Influencing Solvent Selection for Extraction of Ethanol from Aqueous Solutions", Ind. Eng. Chem. Process Des. Dev., vol. 23, 1984, pp. 109-115.

Rousseau, "Handbook of Separation Process Technology", John Wiley & Sons, Inc., 1987, pp. 769-771.

Prasad et al., "Microporous Membrane Solvent Extraction", Separation Science and Technology, 22 (2&3), 1987, pp. 619-640.

Prasad et al., "Further Studies of Solvent Extraction with Immobilizied Interfaces in a Microporous Hydrophobic Membrane", Journal of Membrane Science, vol. 26, 1986, pp. 79-97.

Kiani et al., "Solvent Extraction with Immobilized Interfaces in a Microporous Hydrophobic Membrane", Journal of Membrane Science, vol. 20, 1984, pp. 125-145.

Job et al., "Selection of Organic Solvents for In Situ Extraction of Fermentation Products from Clostridium Thermohydrosulfuricum Cultures", Biotechnology Techniques, vol. 3, 1989, pp. 315-320.

ASTM E 1294-89, Standard Test Method for Pore Size Characteristics of Membrane Filters Using Automated Liquid Proosimeter, 1999, pp. 1-2.

Dickenson, "Filters and Filtration Handbook", 3rd Edition, Elsevier Science Publishers Ltd. 1992, pp. 82-103.

R.J. Lewis, "Hawley's Condensed Chemical Dictionary", Thirteenth Edition, John Wiley & Sons, Inc., 1997, pp. 707-708.

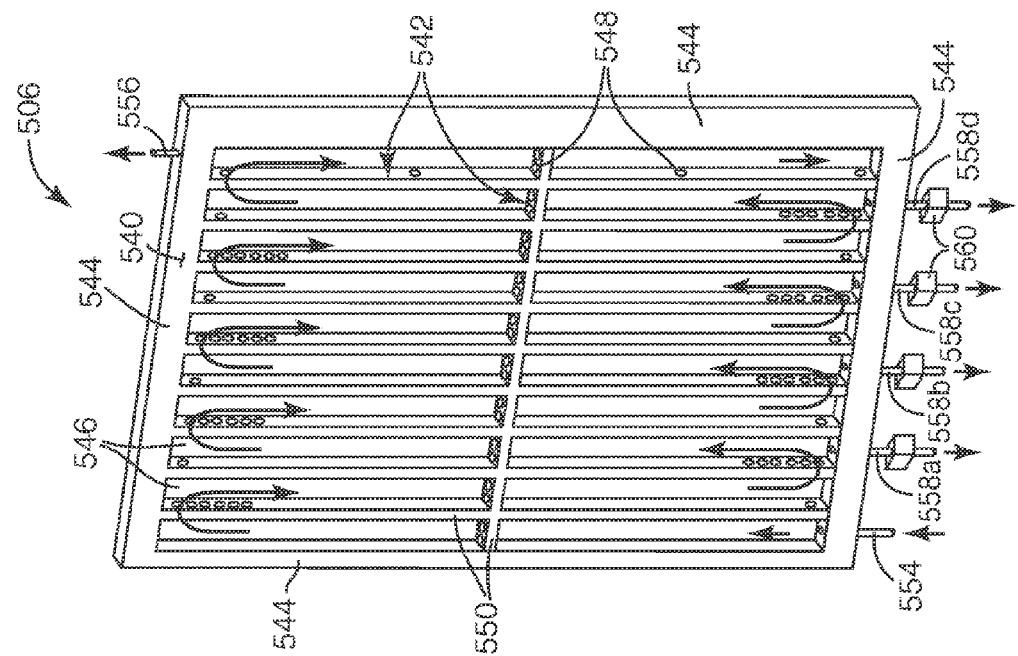
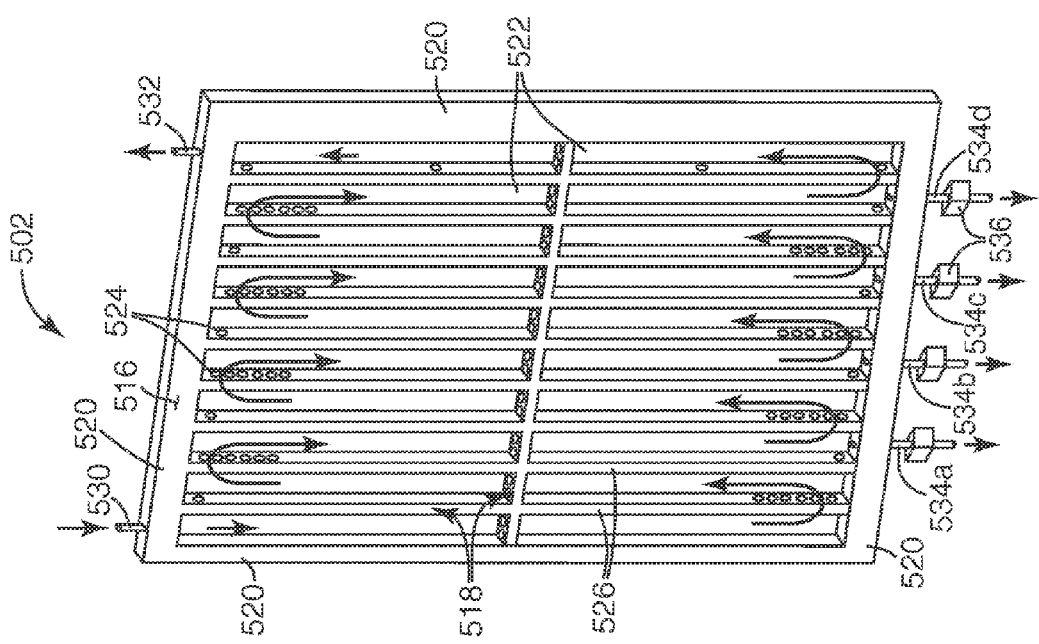

LIQUID-LIQUID EXTRACTION SYSTEM AND METHOD

CROSS-REFERENCE TO RELATED APPLICATION

This is a divisional application of application Ser. No. 10/388,099, filed Mar. 13, 2003, now U.S. Pat. No. 7,105,089 the disclosure of which is hereby incorporated by reference.

FIELD

The present invention relates to systems and methods for extracting a dissolved solute from a first liquid into a second liquid.

BACKGROUND

Liquid-liquid extraction is a commonly employed technique for transferring a solute dissolved in a first liquid to a second liquid that is essentially immiscible with the first liquid. The solution of the solute in the first liquid is generally termed a "feed solution", and the second liquid is generally termed an "extractant" or "liquid extractant". The solute tends to distribute itself between the two liquids in accordance with the relative solubility of the solute in the two liquids when the feed solution is brought into contact with the liquid extractant.

One conventional approach to achieving liquid-liquid extraction is to directly mix the feed solution and the liquid extractant. Unfortunately, this technique often times gives rise to the formation of a persistent dispersion or emulsion within the mixture, rendering the extraction process highly inefficient, in terms of both time and end result.

A microporous membrane extraction methodology has been developed to address the above-identified dispersion concerns. In particular, one side of a microporous membrane is typically contacted with the feed solution, and the opposing side of the microporous membrane with the liquid extractant. A liquid-liquid interface, across which the solute is transferred, is thus formed between the feed solution and the liquid extractant within micropores of the microporous membrane.

The concept of providing gross separation between the feed solution and the liquid extractant via a microporous membrane has proven to be viable. However, the viability of microporous membrane liquid-liquid extraction in an industrial setting typically depends on the rate of extraction (that in turn is a function of the liquid-liquid interface surface area provided by the microporous membrane) and on the ease of replacing the membrane, should it become damaged or fouled. Conventional microporous membrane liquid-liquid extraction apparatuses and methods utilize designs with limited liquid-liquid interface surface area, and that do not facilitate membrane replacement. These inherent inefficiencies have impeded the large scale, commercial implementation of microporous membrane extraction.

Many commercial applications, such as obtaining ethanol from a fermented feed broth, could greatly benefit from the use of a microporous membrane liquid-liquid extraction technique. As such, a need exists for a high productivity liquid-liquid extraction system and method incorporating a microporous membrane adapted to be maintained on a cost effective basis.

SUMMARY

One aspect of the present invention relates to a liquid-liquid extraction system including an outer chamber and an inner chamber. The outer chamber is adapted to contain one of a feed solution and a liquid extractant and defines a containment region. The inner chamber is adapted to contain the other of the feed solution and the liquid extractant within a flow region of the inner chamber. In this regard, the inner chamber is defined by a microporous membrane sleeve that internally maintains a frame. Upon final assembly, at least the flow region of the inner chamber is positioned within the containment region of the outer chamber such that the microporous membrane sleeve establishes an extraction interface between contents of the inner and outer chambers. In one embodiment, the flow region of the microporous membrane sleeve is immersed within a feed solution otherwise contained within the outer chamber. In another embodiment, a plurality of inner chambers, each defined by a microporous membrane sleeve internally maintaining a frame, are positioned within the outer chamber in a side-by-side fashion, with opposing pairs of the inner chambers being separated by a separator plate.

Another aspect of the present invention relates to a liquid-liquid extraction system including an extractant frame, a feed frame, and a microporous membrane. Each of the frames defines an inlet, an outlet, a front face having a plurality of open regions, and a plurality of fluid pathways positioned between the inlet and the outlet. The microporous membrane is sealed between the front faces of the extractant and feed frames, respectively. With this construction, the open regions of the extractant and the feed frames, respectively, are substantially aligned and the microporous membrane establishes an extraction interface at the open regions between a liquid extractant within the extractant frame and a feed solution within the feed frame. In one embodiment, each of the extractant and feed frames define a lattice configuration including a plurality of cross-bars combining to form a plurality of chambers adjacent ones of which are fluidly connected by one or more holes formed through a common cross-bar section.

Another aspect of the present invention relates to a method of extracting a dissolved solute from a first liquid into a second liquid. The method includes providing an outer chamber and positioning an inner chamber within the outer chamber. In this regard, the inner chamber includes a microporous membrane sleeve internally maintaining a frame. The first liquid is dispensed into the outer chamber and the second liquid is dispensed into the inner chamber. In this regard, the first liquid contacts an exterior of the microporous membrane sleeve and the second liquid contacts an interior of the microporous membrane sleeve. Finally, the solute is transferred from the first liquid to the second liquid across pores of the microporous membrane sleeve. In one embodiment, a continuous flow of the second liquid through the inner chamber is established. In another embodiment, the inner chamber is filled with a volume of the second liquid, with that volume being maintained in the inner chamber for a dwell period during which extraction of the solute into the second liquid occurs. In another embodiment, the microporous membrane sleeve is replaced following an extraction operation.

Yet another aspect of the present invention relates to a method of extracting a solute dissolved in a first liquid into a second liquid. The method includes providing an extraction device including opposing first and second frames and a microporous membrane. Each of the frames define a plurality of open regions and a plurality of fluid pathways. The microporous membrane is sealed between the first and second frames. The first liquid is introduced into the first frame such that the first liquid passes through the first frame pathways. Similarly, the second liquid is introduced into the second frame such that the second liquid passes through the second frame pathways. In this regard, the first and second liquids contact the microporous membrane at the open regions of the first and second frames, respectively. Finally, the solute is transferred from the first liquid to the second liquid across pores of the microporous membrane. In one embodiment, the first and second liquids are traversed through a tortuous flow path defined by the first and second frames, respectively.

BRIEF DESCRIPTION OF THE DRAWINGS

FIG. 14A is a perspective view of a feed frame component of the system of FIG. 13;

FIG. 14B is a perspective view of an extractant frame portion of the system of FIG. 13;

DETAILED DESCRIPTION

Figure 1:
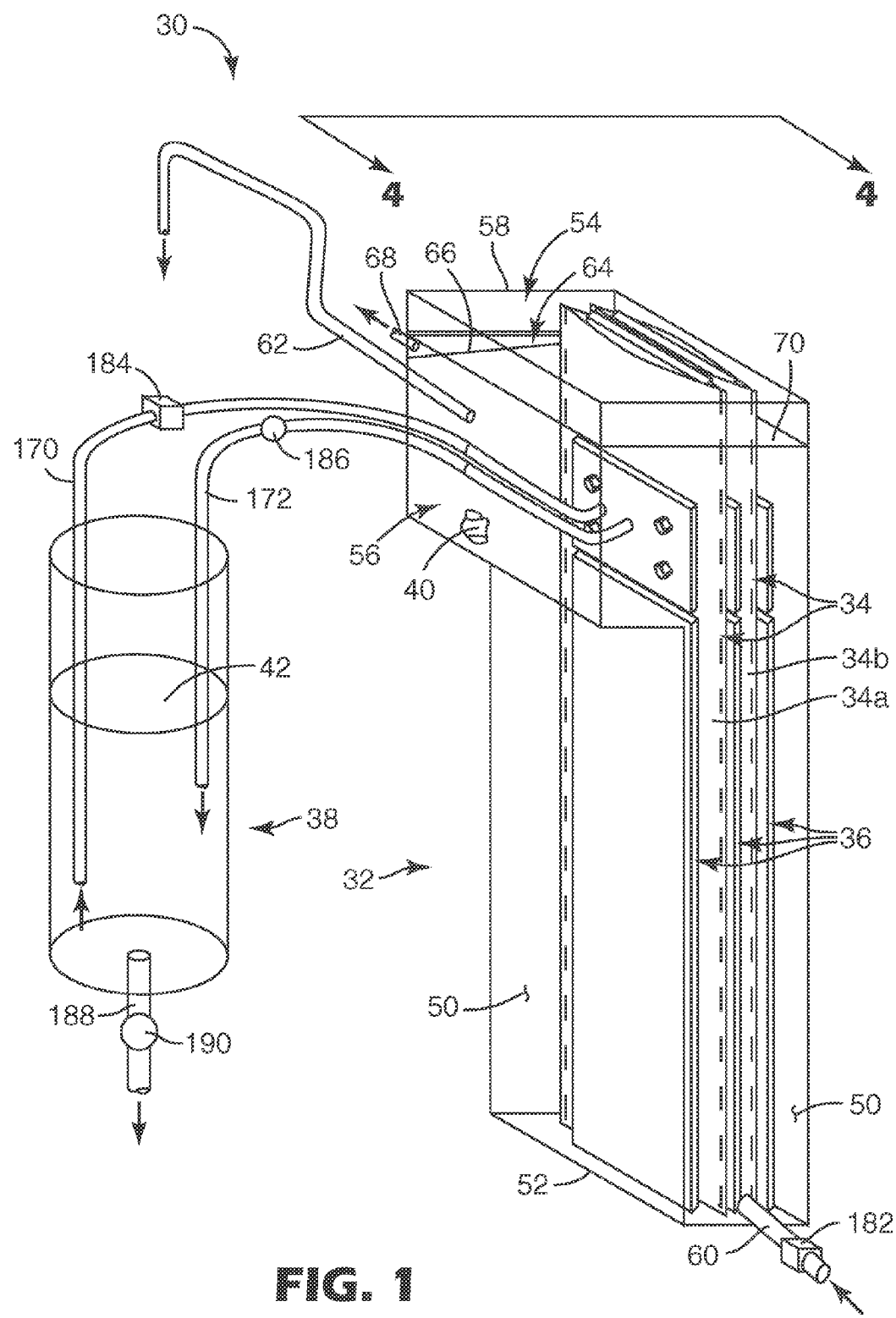
FIG. 1 is a perspective view of a liquid-liquid extraction system in accordance with one embodiment of the present invention.

One embodiment of a liquid-liquid extraction system 30 is shown in FIG. 1. The system 30 includes an outer chamber 32, a plurality of inner chambers 34, a plurality of separator assemblies 36, and a liquid extractant reservoir 38. The various components are described in greater detail below. In general terms, the outer chamber 32 is fluidly connected to a feed solution reservoir (not shown) and contains a volume of feed solution 40 (referenced generally in FIG. 1). The inner chambers 34 are fluidly connected to the liquid extractant reservoir 38 that otherwise supplies a volume of liquid extractant 42 to an interior of each of the inner chambers 34. The inner chambers 34 are positioned within the outer chamber 32, and are each configured to provide a microporous membrane interface between the feed solution 40 in the outer chamber 32 and the liquid extractant 42 contained within the respective inner chambers 34. The separator assemblies 36 are also positioned within the outer chamber 32, separating adjacent pairs of the inner chambers 34. Solute within the feed solution 40 is transferred to (i.e., extracted into) the liquid extractant 42, which is subsequently removed from the inner chambers 34, either on a continuous or periodic basis.

The outer chamber 32 may be in the form of a rigidly constructed tank, having side walls 50 extending from a base 52 that combine to define a containment region (referenced generally at 54 in FIG. 1) for containing a desired volume of the feed solution 40. The outer chamber 32 further defines an upper portion 56 having an open top side 58 opposite the base 52. An inlet port 60 is formed adjacent the base 52, and is fluidly connected to the interior containment region 54. Similarly, an outlet port 62 is provided in the upper portion 56, and is fluidly connected to the interior containment region 54. In one embodiment, the inlet and outlet ports 60, 62 are fluidly connected to the feed solution reservoir (not shown), such that the feed solution 40 is continuously supplied through the outer chamber 32. Alternatively, the inlet port 60 can be fluidly connected to a reservoir of "fresh" (i.e., un-treated) feed solution 40, whereas the outlet port 62 is fluidly connected to a separate reservoir of extracted feed solution (i.e., feed solution that has been subjected to an extraction process as described below). Even further, the reservoir connections to the inlet and outlet ports 60, 62 can be reversed and/or one of the ports 60, 62 eliminated as described below.

In one embodiment, the upper portion 56 of the outer chamber 32 defines an increased cross-sectional area as compared to a remainder of the outer chamber 32, and is configured to facilitate removal of contaminants (not shown) from the feed solution 40 otherwise contained within the outer chamber 32. In particular, a wall of the upper portion 56 may form a trough 64 defined in part by a bottom wall 66 extending in an angular fashion relative to horizontal. The trough 64 is fluidly connected to an exit port 68. Contaminants that otherwise float or rise to a liquid level line (referenced generally at 70 in FIG. 1) of the contained feed solution 40 are captured within the trough 64, the bottom wall 66 of which directs the contaminants to the exit port 68 for removal from the outer chamber 32. With this one construction, the exit port 68 is positioned above the outlet port 62 so as to not interfere with filling/removal of the feed solution 40 relative to the outer chamber 32. Alternatively, other constructions can be employed for skimming at least one contaminant from the contained feed solution 40, or the skimming feature eliminated entirely.

Figure 2:
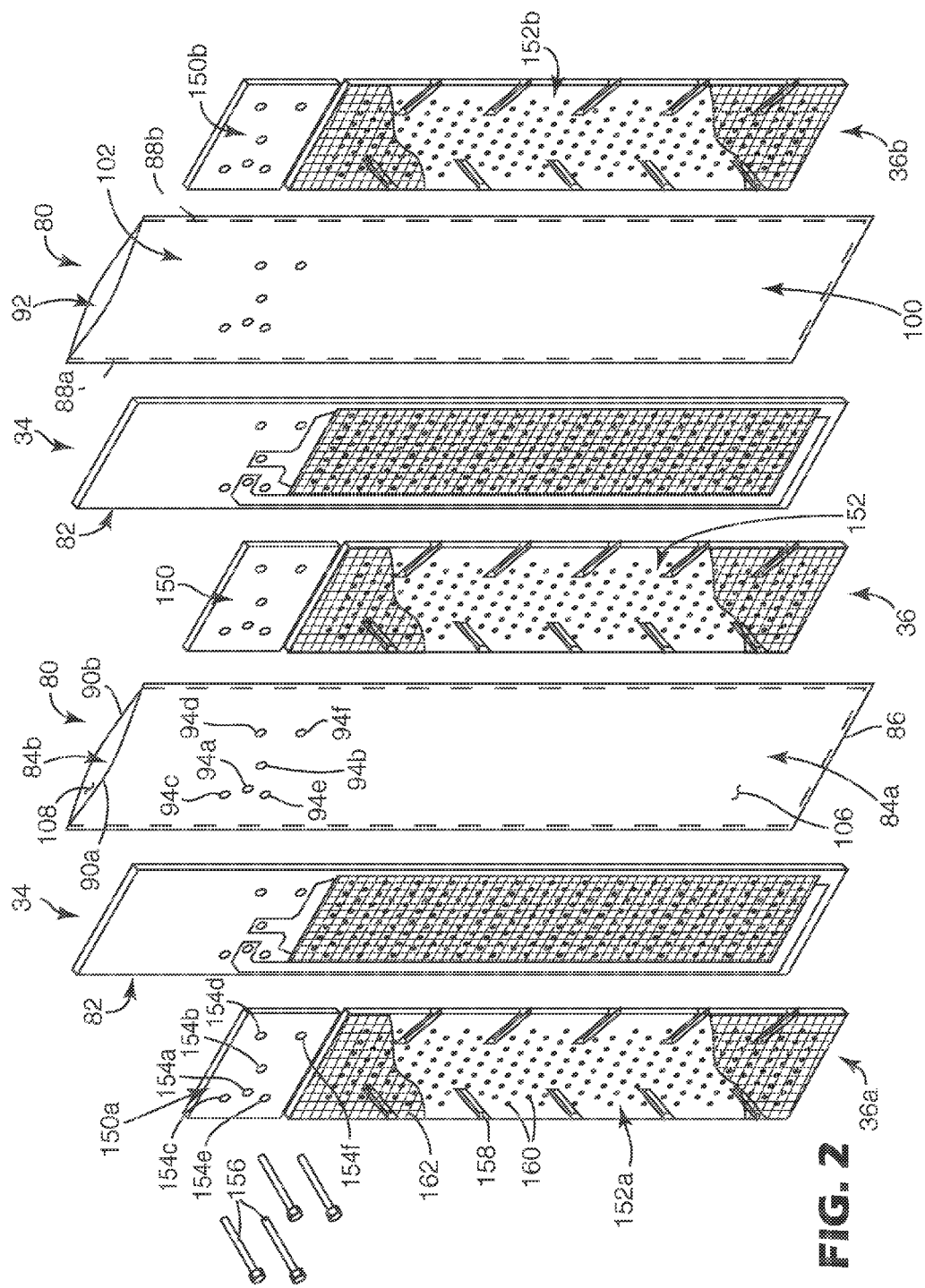
FIG. 2 is an exploded view of inner chambers and separator plates associated with the system of FIG. 1.

The inner chambers 34 are shown in greater detail in FIG. 2. In particular, each of the inner chambers 34 includes a microporous membrane sleeve 80 and a frame 82. The frame 82 is maintained within the corresponding sleeve 80. For purposes of clarity, it is noted that FIG. 2 further illustrates the separator assemblies 36, details of which are provided below.

The microporous membrane sleeve 80 may include opposing major side walls 84a, 84b, sealed to one another at a bottom 86 and opposing sides 88a, 88b. Further, each of the side walls 84a, 84b define top edges 90a, 90b that are, at least prior to assembly of the frame 82, not connected to one another, thus providing an opening 92 to an interior of the sleeve 80 for insertion/removal of the frame 82. In one embodiment, the sleeve 80 is provided with a closure/sealing device (not shown) adapted to effectuate selective closing and/or sealing of the opening 92. For example, a tape can be used to close the opening 92, corresponding re-closable strips can be provided along interiors of the side walls 84*a*, 84*b* adjacent the top edges 90*a*, 90*b*, the top edges 90*a*, 90*b* can be heat sealed to one another, etc. Alternatively, the opening 92 can remain unencumbered at all times.

While the sleeve 80 has been illustrated as assuming an envelope-like form, other configurations are also acceptable. For example, minor side walls can be provided that connected the major side wall 84*a*, 84*b*, such that the sleeve 80 is more rectangular in transverse cross-section. Similarly, an additional section of microporous membrane material can be provided at the bottom 86. Also, the sleeve 80 can be provided with side and/or bottom pleats to more readily accommodate the frame 82.

The sleeve 80 preferably forms a series of holes 94 (designated generally in FIG. 2) at predetermined locations along a length of the sleeve 80. The holes 94 are formed through both of, and aligned relative to, the side walls 84*a*, 84*b*. As described in greater detail below, the holes 94 include tubing holes 94*a*, 94*b* that facilitate liquid flow into and out of the inner chambers 34, and assembly holes 94*c*-94*f* that promote assembly of the separator assemblies 36 to the corresponding inner chambers 34, possibly in conjunction with gasket(s) (not shown). Regardless, the sleeve 80, and thus the inner chamber 34, defines a flow region 100 below the holes 94 and extending to the bottom 86. During use, the liquid extractant 42 (FIG. 1) is contained and/or flows within the flow region 100. The sleeve 80 may further include an upper section 102 opposite the flow region 100. The upper section 102 has a length that is based upon the expected feed solution level line 70 (FIG. 1) and the location of the inner chamber 34 within the outer chamber 32 (FIG. 1). In one embodiment, the upper section 102 is sized to extend above the feed solution level line 70 upon final assembly and operation, thereby preventing the contained feed solution 40 (FIG. 1) from entering the inner chamber 34. Alternatively, where the sleeve 80 is sealed at the top edges 90*a*, 90*b*, the upper section 102 can have any size/length, and can be eliminated entirely.

The material used for the microporous membrane sleeve 80 can assume a wide variety of forms. Microporous membrane materials in accordance with the present invention typically have micrometer sized pores (i.e., micropores) that extend between major surfaces of the membrane. For example, with respect to the embodiment of FIG. 2, each of the side walls 84*a*, 84*b* each define an exterior surface 106 (shown in FIG. 2 for the side wall 84*a*) and an interior surface 108 (shown in FIG. 2 for the side wall 84*b*). Thus, the micropores extend between the exterior and interior surfaces 106, 108 for each of the side walls 84*a*, 84*b*. Regardless, the micropores may be, for example, isolated or interconnected. The microporous membrane material may be formed from any material having micropores therethrough, for example, a microporous thermoplastic polymer. The microporous membrane material used for the sleeve 80 can be flexible or rigid.

Micropore size, thickness, and composition of the microporous membrane materials typically determine the rate of extraction according to the present invention. The size of the micropores of the microporous membrane should be sufficiently large to permit contact between the feed solution 40 (FIG. 1) and the liquid extractant 42 (FIG. 1) within the micropores, but not so large that flooding of the feed solution through the microporous membrane into the extractant occurs.

Microporous membrane materials useful for practice of the present invention may be, for example, hydrophilic or hydrophobic. Microporous membranes can be prepared by methods well known in the art and described in, for example, U.S. Pat. No. 3,801,404 (Druin et al.); U.S. Pat. No. 3,839,516 (Williams et al.); U.S. Pat. No. 3,843,761 (Bierenbaum et al.); U.S. Pat. No. 4,255,376 (Soehngen et al.); U.S. Pat. No. 4,257,997 (Soehngen et al.); U.S. Pat. No. 4,276,179 (Soehngen); U.S. Pat. No. 4,973,434 (Sikar et al.), and/or are widely commercially available from suppliers such as, for example, Celgard, Inc. (Charlotte, N.C.), Tetratec, Inc. (Ivyland, Pa.), Nadir Filtration GmbH (Wiesbaden, Germany), or Membrana, GmbH (Wuppertal, Germany). Exemplary hydrophilic membranes include membranes of porous polyamide (e.g., porous nylon), porous polycarbonate, porous ethylene vinyl alcohol copolymer, and porous hydrophilic polypropylene. Exemplary hydrophobic membranes include membranes of porous polyethylene, porous polypropylene (e.g., thermally induced phase separation porous polypropylene), and porous polytetrafluoroethylene.

Typically, the mean pore size of useful microporous membrane materials (e.g., as measured according to ASTM E1294-89 (1999) "Standard Test Method for Pore Size Characteristics of Membrane Filters Using Automated Liquid Porosimeter") may be greater than about 0.07 micrometer (e.g., greater than about 0.1 micrometer or greater than about 0.25 micrometer), and may be less than about 1.4 micrometers (e.g., less than about 0.4 micrometer or less than about 0.3 micrometer), although microporous membranes having larger or smaller mean pore sizes may also be used. In order to reduce emulsion formation and/or flooding across the membrane, the microporous membrane may be substantially free of pores, tears, or other holes that exceed about 100 micrometers in diameter.

Useful microporous membrane materials for the sleeve 80 typically have a porosity in a range of from at least about 20 percent (e.g., at least about 30 percent or at least about 40 percent) up to about 80 percent, about 87 percent, or even about 95 percent, based on the volume of the microporous membrane material.

Typically, useful microporous membrane materials for the sleeve 80 have a thickness of at least about 25 micrometers (e.g., at least about 35 micrometers or at least about 40 micrometers), and/or may have a thickness of less than about 80 micrometers (e.g., less than about 60 micrometers or even less than about 50 micrometers), although membrane materials of any thickness may be used. Typically, microporous membrane materials for the sleeve 80 should be mechanically strong enough, alone or in combination with an optional porous support member, to withstand any pressure difference that may be imposed across the microporous membrane sleeve 80 under the intended operating conditions.

The microporous membrane material for the sleeve 80 may comprise at least one hydrophobic (i.e., not spontaneously wet out by water) material. Exemplary hydrophobic materials include polyolefins (e.g., polypropylene, polyethylene, polybutylene, copolymers of any of the forgoing and, optionally, an ethylenically unsaturated monomer), and combinations thereof. If the microporous membrane material is hydrophobic, a positive pressure may be applied to the contained feed solution 40 (FIG. 1) relative to the liquid extractant 42 (FIG. 1) to aid in wetting the microporous membrane sleeve 80.

In some embodiments of the present invention, the microporous membrane material of the sleeve 80 may be hydrophilic, for example, a hydrophilic porous polypropylene membrane material having a nominal average pore size in a range of from 0.2 to 0.45 micrometers (e.g., as marketed under the trade designation "GH POLYPRO MEMBRANE" by Pall Life Sciences, Inc., Ann Arbor, Mich.). If the microporous membrane material of the sleeve 80 is hydrophilic, positive pressure may be applied to the contained liquid extractant 42 (FIG. 1) relative to the contained feed solution 40 (FIG. 1) to facilitate immobilization of the liquid-liquid interface within the microporous membrane sleeve 80. Exemplary membranes materials useful for the sleeve 80 include microporous membranes as described in U.S. Pat. No. 3,801,404 (Druin et al.); U.S. Pat. No. 3,839,516 (Williams et al.); U.S. Pat. No. 3,843,761 (Bierenbaum et al.); U.S. Pat. No. 4,255,376 (Soehngen); U.S. Pat. No. 4,257,997 (Soehngen et al.); and U.S. Pat. No. 4,276,179 (Soehngen); U.S. Pat. No. 4,726,989 (Mrozinski); U.S. Pat. No. 5,120,594 (Mrozinski); and U.S. Pat. No. 5,238,623 (Mrozinski), the disclosures of which are incorporated herein by reference.

The frame 82 is sized to be selectively maintained within the sleeve 80. With additional reference to FIGS. 3A and 3B, the frame 82 may include a central panel 110 and opposing outer panels 112 (one of which is shown in FIG. 3B). The outer panels 112 are assembled to opposite sides of the central panel 110, the combination of which, upon placement within a corresponding sleeve 80, prevents the side walls 84a, 84b from contacting one another, as well as facilitates desired flow of the liquid extractant 42 (FIG. 1) within the flow region 100 of the inner chamber 34.

The central panel 110 is, in one embodiment, formed of a rigid material such as, for example, polymethyl methacrylate, and defines a flow region 114 within which a plurality of fluid pathways 116 is formed. The flow region 114 of the central panel 110 corresponds in size with that of flow region 100 of the sleeve 80. The fluid pathways 116 are preferably holes extending through a thickness of the central panel 110, allowing fluid flow from one side of the central panel 110 to the other. The central panel 110 further defines a lower region 118 and an upper region 120. The lower region 118 is provided below the flow region 114, whereas the upper region 120 is provided immediately above the flow region 114 (relative to the orientation of FIG. 3A).

With these conventions in mind, the central panel 110 forms a slot or conduit 122 extending from the upper region 120 to the lower region 118. The conduit 122 is fluidly connected to an inlet port 124 in the upper region 120 for the delivery of the liquid extractant 42 (FIG. 1) into the conduit 122. Conversely, the conduit 122 is open (e.g., a plurality of openings (not shown)) at the lower region 118. With this configuration, liquid introduced into the conduit 122 at the inlet port 124 is directed, via the conduit 122, from the upper region 120 to the lower region 118, and released into the flow region 114.

The central panel 110 may further form an outlet port 126 in the upper region 120. As described in greater detail below, liquid extractant 42 (FIG. 1) introduced into the flow region 114, via the conduit 122, flows upwardly to the outlet port 126. A separate tubing (not shown) otherwise fluidly connected to the outlet port 126 is then employed to remove the liquid extractant 42 from the inner chamber 34.

Figure 3A:
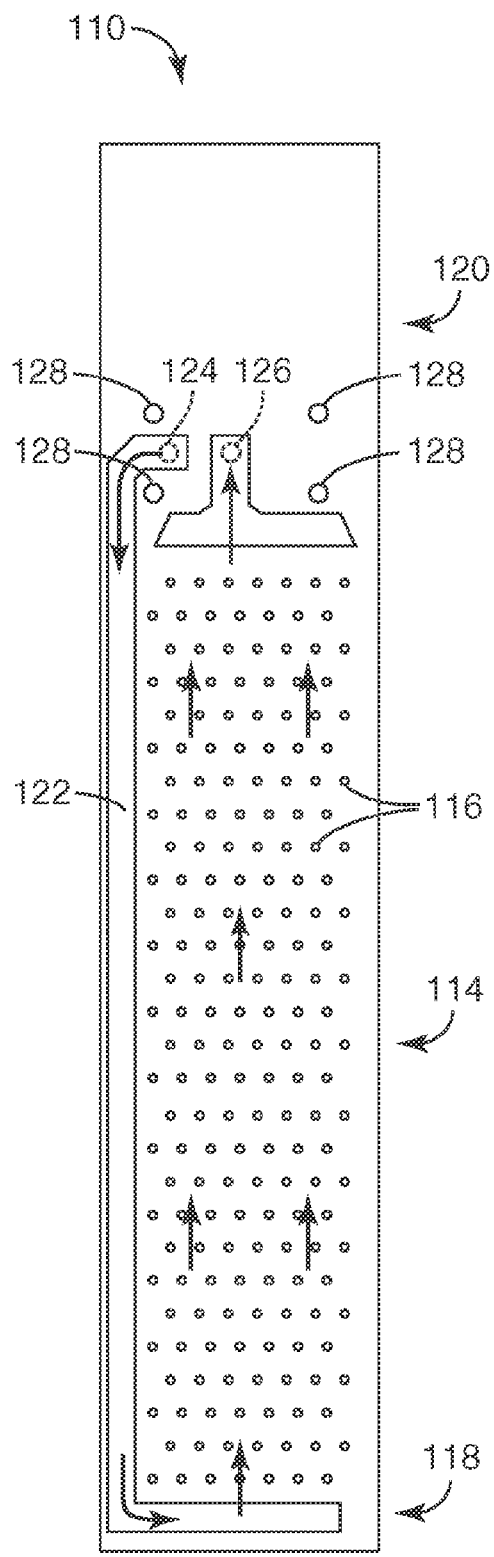
FIG. 3A is a front view of a central panel associated with the inner chamber of FIG. 2.
Figure 3B:
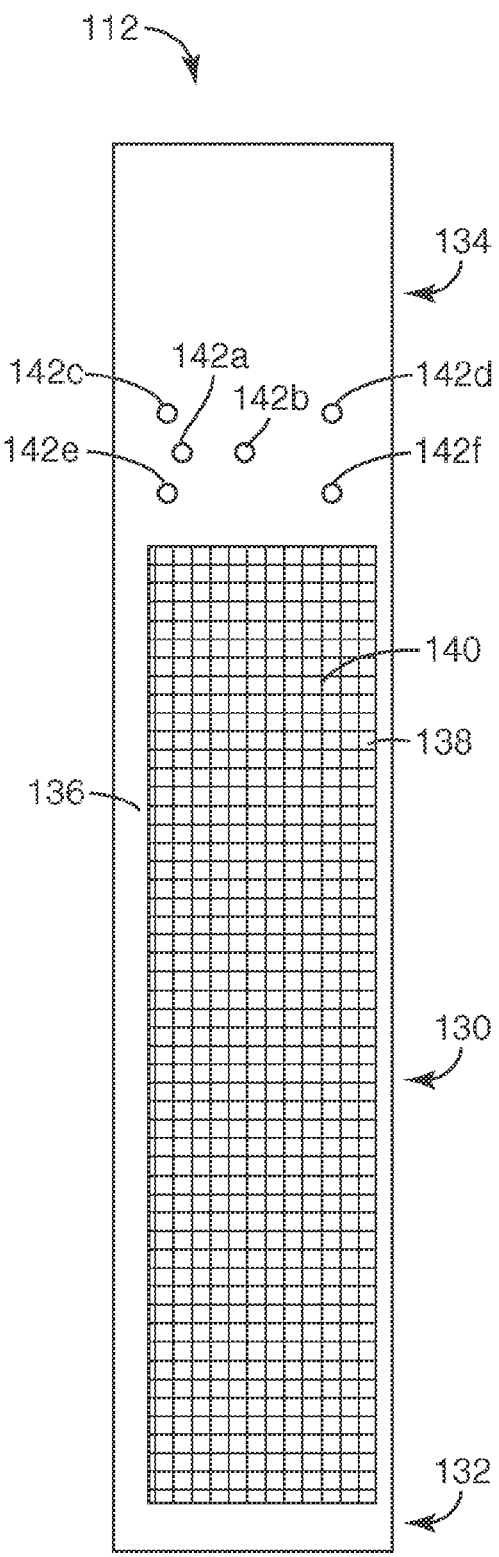
FIG. 3B is a front view of an outer panel associated with the inner chamber of FIG. 2.

Finally, the central panel 110 forms a series of assembly holes 128 (referenced generally in FIG. 3A). As described below, the assembly holes 128 are provided to facilitate assembly of the corresponding inner chamber 34 and separator assemblies 36 to one another and to the outer chamber 32 (FIG. 1)

The outer panels 112 preferably correspond in size and shape with the central panel 110 as shown in FIG. 3B. In this regard, the outer panels 112 each define a flow region 130 corresponding with the flow regions 114, 100 previously described, a lower region 132 and an upper region 134. The flow region 130 includes a closed section 136 and an open section 138. The closed section 136 corresponds in size and shape with the conduit 122 (FIG. 3A) of the central panel 110 (FIG. 3A) such that upon final assembly of the panels 110, 112, the closed section 136 covers the conduit or slot 122, preventing fluid flow therefrom. Conversely, the open section 138 is characterized by an absence of material, and does not prevent fluid flow from occurring outwardly relative to the outer panel 112. That is to say, liquid extractant (not shown) otherwise released within the flow region 114 (FIG. 3A) of the central panel 110 will readily flow through the open section 138. In one embodiment, however, a screen or similar mesh material 140 is secured within the open section 138. As liquid flows about the screen 140, a mixing action is imparted into the liquid, enhancing the extraction process as described below. A variety of alternative constructions can be employed for the screen 140 (e.g., a lattice structure), or the screen 140 can be eliminated entirely.

Finally, the outer panels 112 each preferably form a plurality of holes (referenced generally at 142 in FIG. 3B). The plurality of holes 142 include tubing holes 142a, 142b adapted to facilitate passage of appropriate tubing to the inlet port 124 (FIG. 3A) and the outlet port 126 (FIG. 3A), respectively, of the central plate 110 (FIG. 3A). Remainders of the holes 142 are assembly holes 142c-142f, adapted to promote assembly of the inner chambers 34/separation assemblies 136, as well as assembly to the outer chamber 32 (FIG. 1).

Returning to FIG. 2, individual ones of the separator assemblies 36 are adapted for placement between corresponding pairs of the inner chamber 34, and in one embodiment each include a head portion 150 and a separator plate 152. As a point of reference, FIG. 2 illustrates three of the separator assemblies 36, including outer separator assemblies 36a, 36b. Each of the separator assemblies 36 are generally of the same configuration, with optional features of the outer separator assemblies 36a, 36b described below. For ease of illustration, however, features common to the separator assemblies 36 (including the outer separator assemblies 36a, 36b) are referenced in FIG. 2 relative to only one of the separator assemblies 36 (i.e., the outer separator assembly 36a), it being understood that unless otherwise described, each of the separator assemblies 36 (including the outer separator assemblies 36a, 36b) include the common features. Thus, in subsequent descriptions, reference to features of the "head portion 150" and the "separator plate 152" are in one embodiment equally applicable to all relevant components shown in FIG. 2. With the above reference conventions in mind, in one embodiment, the head portion 150 and the separator plate 152 are provided as separate components. Alternatively, the head portion 150 and the separator plate 152 can be formed as an integral, unitary plate.

The head portion 150 is a rigid body adapted for assembly to the inner chamber(s) 34, and can form tubing holes 154a, 154b and assembly holes 154c-154f. As a point of reference, the holes 154a-154f are referenced in FIG. 2 for the head portion 150a of the outer separator assembly 36a, it being understood that in one embodiment, each of the head portions 150 (including the head portion 150b) include similar features. As with the various components of the inner chamber 34, the tubing holes 154a, 154b provide a passageway for tubing (not shown) to and from the inner chamber(s) 34. Conversely, the assembly holes 154c-154f are provided for assembly of the head portions 150/inner chambers 34 to one another, as well as to possibly the outer chamber 32 (FIG. 1), such as by bolts 156.

The separator plates 152 are also rigid bodies and may be configured to promote fluid flow along a length thereof. Thus, in one embodiment, the separator plate 152 forms a plurality of slots 158 and a plurality of apertures 160. Once again, the slots 158 and the apertures 160 are referenced in FIG. 2 for the separator plate 152a of the outer separator assembly 36a, it being understood that in one embodiment, each of the separator plates 152 (including the separator plate 152b) include similar features. The slots 158 and the apertures 160 may extend through a thickness of the separator plate 152, for example, with the slots 158 extending in an upwardly angled fashion (as shown in FIG. 2). With this orientation, as fluid fills from a bottom of the separator plate 152, the slots 158 direct the fluid toward a center thereof. Finally, in one embodiment, a screen or other mesh material 162 is provided at both sides of the separator plate 152 (one of which is shown in FIG. 2 for each of the separator plates 152, 152a, 152b). As previously described, the screen 162 imparts a beneficial mixing action into fluid that otherwise traverses the screen 162 material.

As previously described, the head portion 150 and the separator plate 152 of each separator assembly 36 are, in one embodiment, separate components. With this one embodiment, the outer separator plates (152a and 152b in FIG. 2) of the outer separator assemblies (36a and 36b in FIG. 2) have a slightly enlarged width (not illustrated in FIG. 2) as compared to inner chambers 34, and in particular the microporous membrane sleeves 80, as well as any intermediate separator plates 152. With this one construction, the outer separator plates 152a, 152b are secured to one another, such as by bolts (not shown) positioned at peripheries thereof. Alternatively, the outer separator plates 152a, 152b can be identical in size as compared to any intermediate separator plate(s) 152, and assembled in a differing fashion (e.g., where the separator assemblies 36 are each formed as an unitary structure, attachment of the head portion 150 in turn effectuates attachment of the corresponding separator plate 152).

Assembly of the inner chambers 34 and the separator assemblies 36 is described with reference to FIGS. 1, 2, and 4. Each inner chamber 34 is assembled by placing one of the frames 82 into a corresponding one of the sleeves 80. A series of the so-assembled inner chambers 34 are then assembled to the separator assemblies 36 by locating one of the head portions (designated as 150c in FIG. 4) between the two inner chambers (designated as 34a and 34b in FIGS. 1 and 4). In one embodiment, a gasket (not shown) is positioned between the head portion 150c and the inner chambers 34a, 34b, respectively. Additional ones of the head portions (designated as 150a, 150b in FIG. 4) are positioned at opposite sides of the inner chambers 34a, 34b, with a gasket (not shown) possibly inserted between the head portion 150a and the inner chamber 34a, and a gasket (not shown) possibly inserted between the head portion 150b and the inner chamber 34b. The bolts 156 are then passed through the various assembly holes 94, 128, 142, 154 (FIGS. 2, 3A, 3B) provided by the sleeves 80, the central panels 110, the outer panels 112, and the head portions 150, respectively, thereby connecting the components. The separator plates 152 are assembled by placing one of the separator plates (designated as 152c in FIG. 4) between the inner chambers 34a, 34b, below the corresponding head portion 150c. The outer separator plates 152a, 152b are positioned at opposites sides of the inner chambers 34a, 34b, respectively, and attached to each, such as by bolts (not shown).

Figure 4:
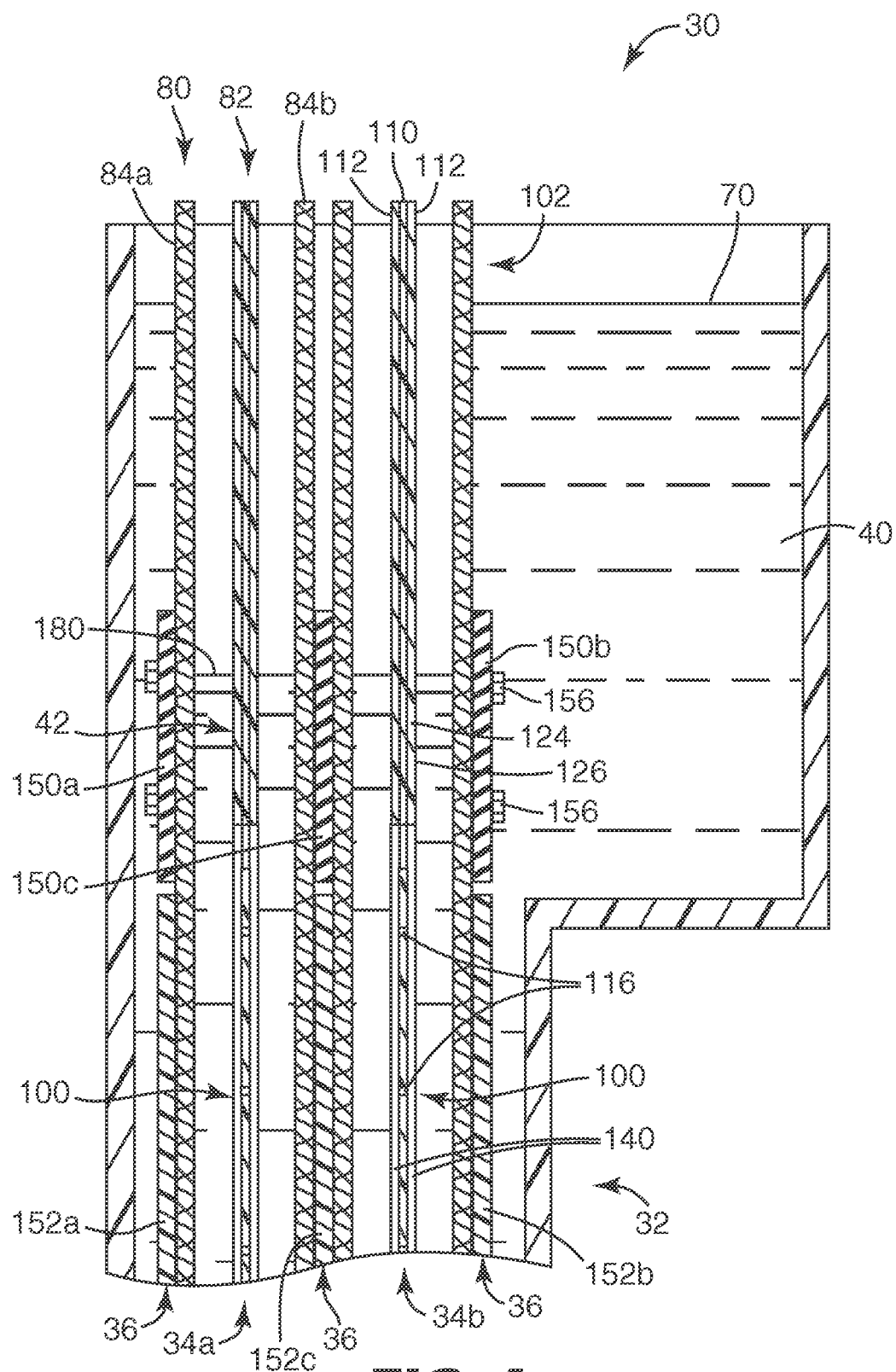
FIG. 4 is a cross-section of a portion of the system of FIG. 1, taken along the lines 4-4.

While only two of the inner chambers 34a, 34b and three of the separator assemblies 36 are illustrated in FIGS. 1 and 4, any other number is equally acceptable. For example, more than 10 of the inner chambers 34 can be provided (with a corresponding number of separator assemblies 36).

The so-assembled inner chambers 34/separator assemblies 36 are then assembled to the outer chamber 32. For example, in one embodiment in which the frames 80 and the separator plates 152 are relatively rigid, the inner chambers 34/separator plates 152 can be loaded into the outer chamber 32 as shown in FIG. 1, resting on the base 52 of the outer chamber 32. Alternatively, the inner chambers 34/separator assemblies 36 can be more positively affixed to the outer chamber 32, such as by attaching the bolts 156 to the outer chamber 32. Even further, a separate attachment mechanism can be provided whereby the inner chambers 34/separator plates 152 are spaced from the base 52 of the outer chamber.

Inlet and outlet tubing 170, 172 is fluidly connected between the liquid extractant reservoir 38 and the inner chambers 34. In particular, the inlet and outlet tubing 170, 172 are fluidly connected to the inlet port 124 and the outlet port 126 (best shown in FIG. 3A) respectively, of the central plate 110 provided with each of the inner chambers 34. In one embodiment, the inner chambers 34 are fluidly connected in series to the inlet and outlet tubing 170, 172; alternatively, the inner chambers 34 can be fluidly connected in parallel. Regardless, the inlet and outlet tubing 170, 172 pass through the various tubing holes 94a, 142a, 154a, and 94b, 142b, 154b (FIGS. 2, 3A, 3B), respectively, as previously described.

During use, and in accordance with one method of the present invention, the feed solution 40 is dispensed into the outer chamber 32, and the liquid extractant 42 is dispensed into the inner chambers 34. In one embodiment, the final feed solution fill level line 70 is above the flow regions 100 of the inner chambers 34; however, the upper portion 102 of each sleeve 80 extends above the feed solution level line 70 such that the sleeves 80 need not necessarily be sealed at a top thereof. Alternatively, where the sleeves 80 are completely sealed, an entirety of the sleeve 80 can be below the final solution fill level line 70. Regardless, at least the flow regions 100 of each of the inner chambers 34 are immersed within the contained feed solution 40.

The feed solution 40 and the liquid extractant 42 may be continuously delivered to, and removed from, the outer and inner chambers 32, 34, respectively. In this regard, the feed solution 40 may be introduced into the outer chamber 32 via the inlet port 60 (such as by a pump 182), and removed from the outer chamber 32 (e.g., gravity-induced flow, pump, etc.) via the outlet port 62. As the feed solution 40 fills/flows within the outer chamber 32, a volumetric pressure is created against the inner chambers 34. While a volume of the liquid extractant 42 within the respective inner chambers 34 will preferably offset this volumetric pressure, the frame 82 (FIG. 2) associated with each inner chamber 34 prevents the corresponding sleeve 80 side walls 84a, 84b from contacting one another in a manner that might otherwise undesirably generate a "dead" flow zone. Further, the separator plates 152 prevent adjacent inner chambers 34 from contacting one another, again avoiding potential reduced flow areas. The slots 158 and the apertures 160 (FIG. 2) in the separator plates 152 ensure that the feed solution 40 contacts exterior surfaces of each of the inner chambers 34. In addition, as the feed solution 40 fills/flows within the outer chamber 32, the screens 162 (FIG. 2) preferably associated with each of the separator plates 152 impart a slight mixing action into the feed solution 40 flow.

Similarly, the liquid extractant 42 is introduced, possibly forced by a pump 184, into each of the inner chambers 34 via the inlet tubing 170 otherwise fluidly connected to the inlet port 124 (FIG. 3A) in the corresponding central panel 110 (FIG. 3A), and removed from the inner chambers 34 via the outlet port 126 (FIG. 3A) otherwise fluidly connected to the outlet tubing 172. As previously described with respect to FIG. 3A, the liquid extractant 42 is directed to the bottom region 118 of the central panel 110, and thus a bottom of the internal flow region 100 of each inner chamber 34. As the liquid extractant 42 subsequently fills the microporous membrane sleeve 80, the fluid pathways 116 and the screens 140 provided within each inner chamber 34 create a tortuous flow pattern, causing the filling/flowing liquid extractant 42 to mix.

In one embodiment, a final liquid extractant level line 180 (best shown in FIG. 4) is achieved within each of the inner chambers 34 that is below the final feed solution level line 70. The level lines 70/180 may be selected to establish a desired pressure differential across the microporous membrane sleeves 80. To this end, in an embodiment wherein the feed solution 40 and the liquid extractant 42 continuously flow through the respective chambers 32, 34, the desired pressure differential can be achieved by regulating the flow rate and/or level 180 of the liquid extractant 42, such as, for example, via a control valve 186 on the outlet tubing 172 and/or the pump 184 on the inlet tubing 170. Alternatively, other pressure/flow regulation systems can be employed such as those described in U.S. Pat. No. RE 34,828, the teachings of which are incorporated herein by reference. Finally, in one embodiment, tubing 188 is fluidly connected to a bottom of the liquid extractant reservoir 38 and is provided with a control valve 190. The optional tubing 188/control valve 190 provide a mechanism for removing feed solution, that otherwise undesirably enters the liquid extraction stream, from the liquid extractant reservoir 38.

Regardless of whether the feed solution 40 and/or the liquid extractant 42 are continuously fed to, and/or recirculated within, the respective chambers 32, 34 or a fixed volume maintained for a dwell period in one or both of the chambers 32, 34, an extraction interface is established across the side walls 84a, 84b of each of the microporous membrane sleeves 80. Solute within the feed solution 40 transfers through the pores of the side walls 84a, 84b to the liquid extractant 42. Finally, in one embodiment, contaminants (not shown) in the feed solution 40 are skimmed out via the trough 64.

Over time, the microporous membrane sleeves 80 may begin to deteriorate due to inadvertent contact with other components of the system 30 and/or accumulation of material within the pores. Under these circumstances, the sleeves 80 are readily replaceable components. The inner chamber 34 having the sleeve 80 to be replaced is simply disassembled from the remaining inner chambers 34/separator assemblies 36, and the associated frame 82 removed therefrom. In this regard, and with reference to FIG. 2, where a temporary seal is provided across the top edges 90a, 90b of the sleeve 80, the seal is removed to facilitate access to the frame 82. The frame 82 is then inserted into a new sleeve 80, and the inner chamber 34 re-assembled to the other components. This represents a significant improvement over existing extraction devices in which the microporous membrane is effectively permanently sealed within a housing and cannot readily be replaced.

An additional feature available with the system 30 of FIG. 1 relates to a more thorough "cleaning" of contaminants from the contained feed solution 40. As previously described, the outer chamber 32 may include the trough 64 (or similar configuration) for removal/skimming of contaminants from the feed solution 40. Over time, however, the quantity of contaminants in the feed solution 40 may rise to an unacceptable level. Under these circumstances, the contaminants may be removed, for example, by extraction with an appropriate hydrocarbon-based decontaminating solution, such as deodecane, recirculated through the feed solution 40.

The above described system 30 and related method of operation is highly conducive to large-scale, commercial applications. To this end, the outer chamber 32 is sized to accommodate as many of the inner chambers 34 as desired, with each inner chamber 34 potentially being of a large size. For example, in one embodiment, the inner chambers 34 have a length on the order of 15 feet (4.57 meters), and in upwards of thirty of the inner chambers 34 are provided (and a corresponding number of the separator assemblies 36). With this or similar configurations, large volumes of feed solution can be subjected to an extraction process, as required, for example, in the extraction of ethanol from a fermented broth, preferred liquid extractant formulations for which are described in commonly-assigned U.S. patent application Ser. No. 10/387,697, entitled "Method for Obtaining Ethanol", and filed concurrently herewith, the disclosure of which is incorporated by reference. Alternatively, the system 30 and associated method of the present invention are equally useful for a wide variety of other extraction processes, each entailing varying feed solution(s) and/or liquid extractant(s). Virtually any solvent can be processed by the system 30 (and all alternative systems described below).

Figure 5:
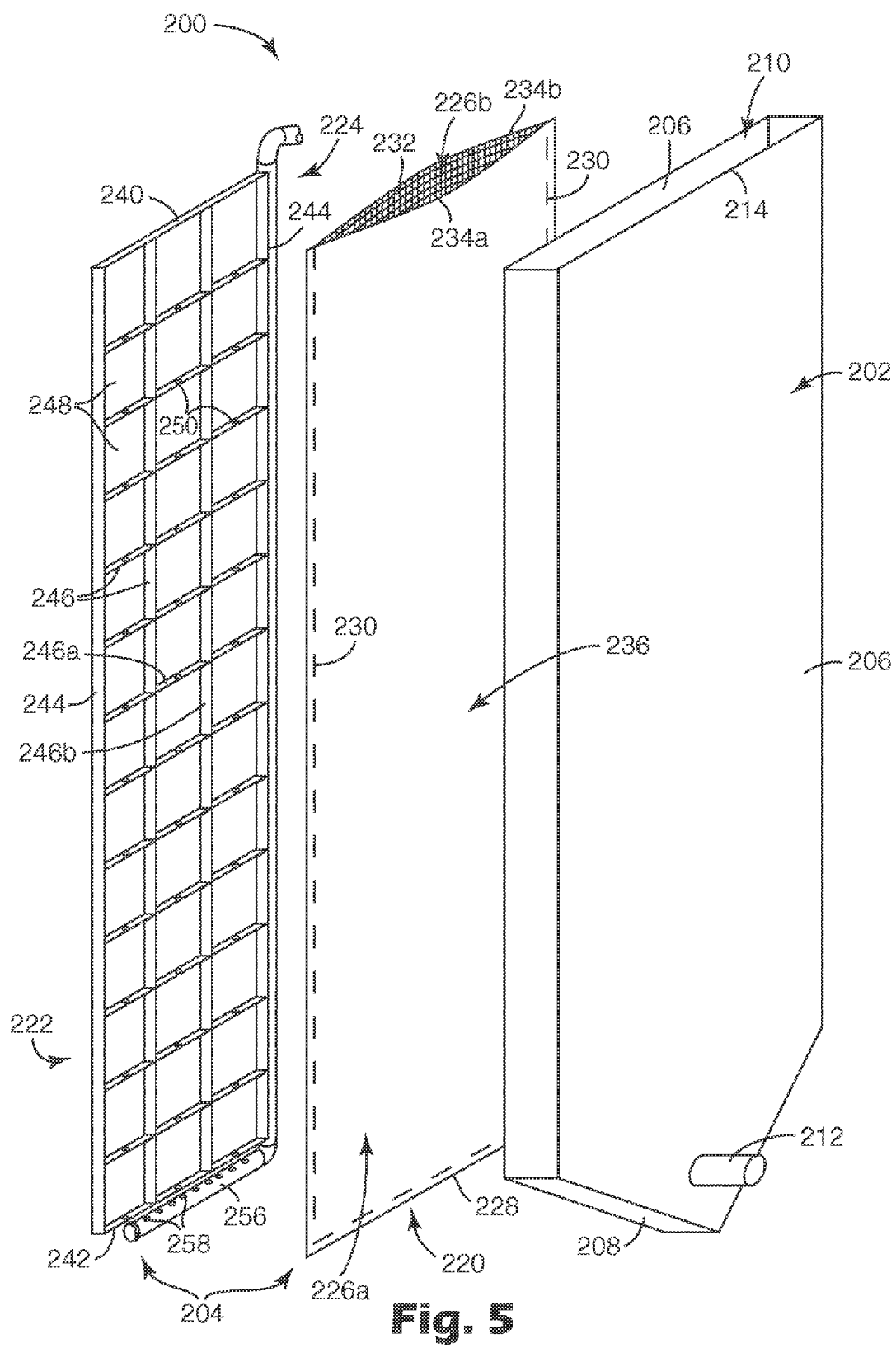
FIG. 5 is an exploded view of an alternative embodiment liquid-liquid extraction system in accordance with the present invention.

The system 30 described above is but one example of a liquid-liquid extraction system and method appropriate for large scale application in accordance with the present invention. For example, an alternative embodiment liquid-liquid extraction system 200 is shown in FIG. 5. The system 200 is similar to the system 30 (FIG. 1) previously described, and includes an outer chamber 202 and an inner chamber 204. In general terms, a feed solution (not shown) is contained within the outer chamber 202, and a liquid extractant (not shown) is contained within the inner chamber 204. The inner chamber 204 establishes a microporous membrane interface between the contained feed solution and the liquid extractant. Solute within the feed solution is transferred or extracted to the liquid extractant, which is subsequently removed from the inner chamber 204, either periodically or continuously.

The outer chamber 202 is a preferably a rigidly constructed containment tank, and can assume a variety of shapes/dimension. Regardless, the outer chamber 202 includes walls 206 extending from a base 208 that combine to define a containment region 210 (referenced generally in FIG. 5). In one embodiment, a port 212 is provided at a bottom of the outer chamber 202, and is fluidly connected to the containment region 210. The outer chamber 202 may be configured such that liquid is dispensed into, and removed from, the containment region via the port 212. With this in mind, the base 208 may be angled as shown in FIG. 5 to promote removal of the liquid from the outer chamber 202. Finally, a top side 214 of the outer chamber 202 may be open to the containment region 210.

The inner chamber 204 includes a porous membrane sleeve 220, a frame 222, and a conduit 224. The porous membrane sleeve 220 may be constructed of materials previously described with respect to the sleeve 80 (FIG. 2), and defines opposing major side walls 226a, 226b sealed to one another along a bottom 228 and opposing sides 230. In one embodiment, a backing material 232 (shown for the side wall 226b in FIG. 5), such as, for example, a soft mesh or a blown microfiber fabric, is applied to an interior surface of the side walls 226a, 226b to protect the microporous membrane material from being damaged by contact with the frame 222. As with the sleeve 80, top edges 234a, 234b of the side walls 226a, 226b, respectively, are not initially sealed to one another, to provide access to an internal flow region 236 defined by the sleeve 220 (and thus the inner chamber 204), such as for insertion of the frame 222 and the conduit 224. Finally, the sleeve 220 can be sized to have a length greater than an expected final fill level of the feed solution (not shown) within the outer chamber 202.

The frame 222 may be a rigid structure defined by a top member 240, a bottom member 242, opposing side members 244, and a plurality of cross-bars 246 (referenced generally in FIG. 5). The cross-bars 246 can include at least one horizontal cross-bar 246a extending between the opposing side members 244, and at least one vertical cross-bar 246b extending between the top and bottom members 240, 242. In this regard, the cross-bars 246 intersect with one another, creating a plurality of open regions 248. Adjacent ones of the regions 248 are fluidly connected to one another by at least one fluid pathway 250 formed in a corresponding horizontal cross-bar 246b. The fluid pathways 250 are small holes, sized to induce a non-laminar flow into the liquid extractant (not shown) as it fills the inner chamber 204, as described below. Alternatively, more or less of the cross-bars 246 and/or the fluid pathways 250 can be provided. In one alternative embodiment, the cross-bars 246 are eliminated entirely.

The conduit 224 can be connected to the frame 222, and defines a leading end 256 positioned below the bottom member 242 of the frame 222. The leading end 256 forms a plurality of openings 258 that facilitate fluid flow into and out of the conduit 224.

Figure 6:
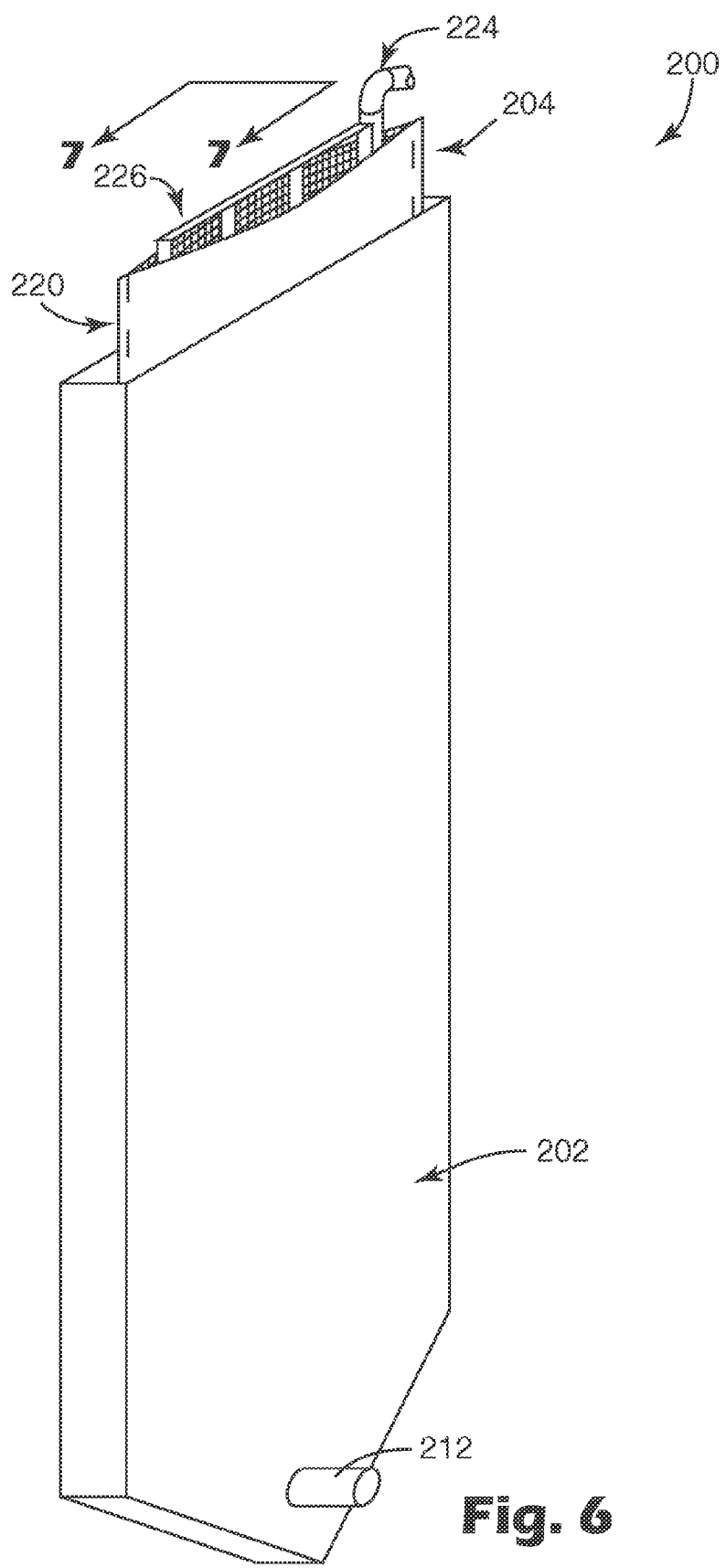
FIG. 6 is a perspective view of the system of FIG. 5 upon final assembly.

With reference to FIG. 6, the inner chamber 204 is assembled by inserting the frame 222 into the sleeve 220, with the leading end 256 of the conduit 224 positioned below the frame 222 as shown in FIG. 5. The inner chamber 204 is then positioned within the outer chamber 202. In one embodiment, the bottom 228 (FIG. 5) of the sleeve 220 rests on the base 208 of the outer chamber 202, supported by the leading end 256 of the conduit 224 and the frame 222. Alternatively, the inner chamber 204 can be more positively attached to the outer chamber 202 by a separate attachment device. Regardless, the conduit 224 extends from the inner chamber 204 and is fluidly connected to a supply/reservoir (not shown) of liquid extractant.

Figure 7:
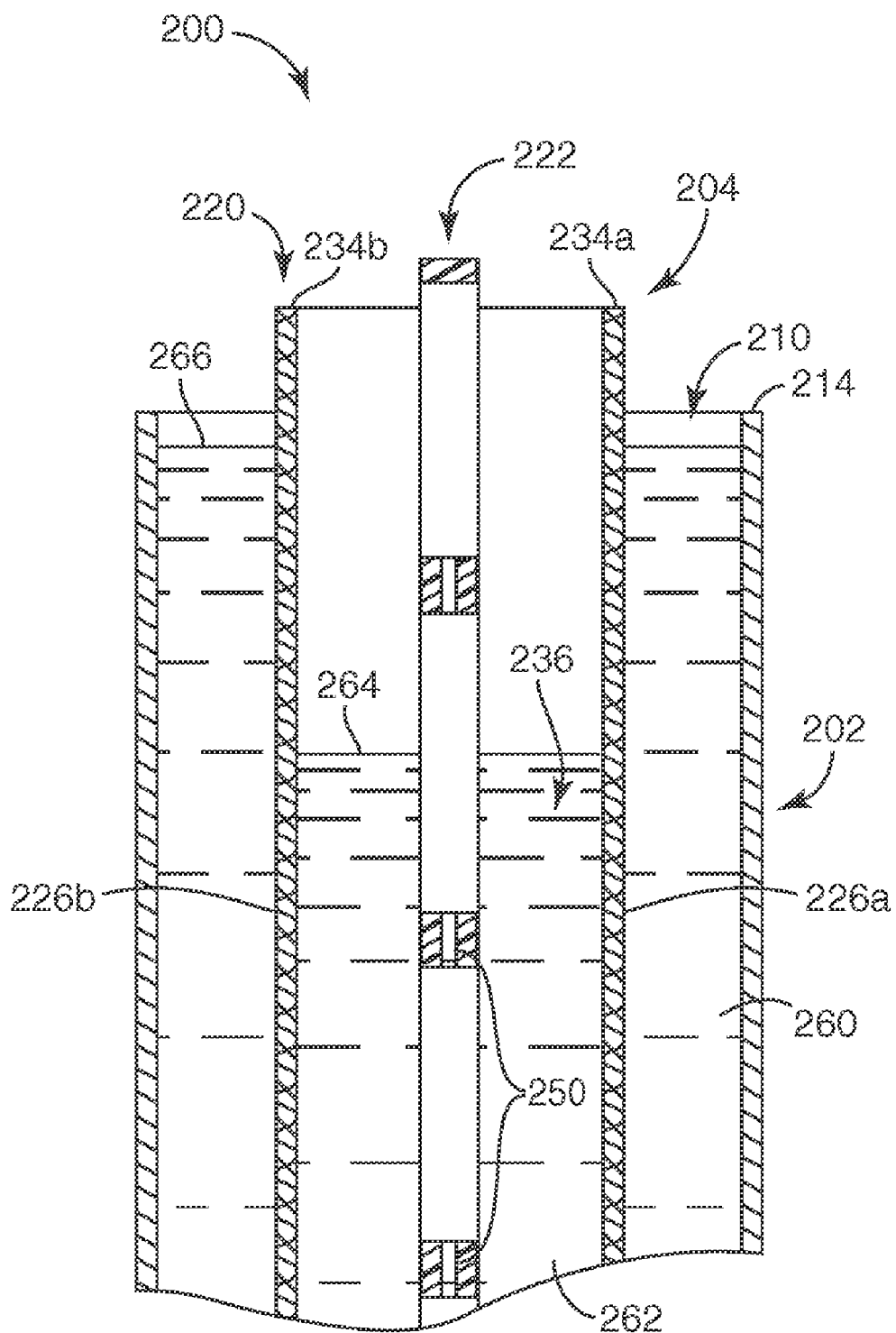
FIG. 7 is a cross-sectional view of a portion of the system of FIG. 6, taken along the lines 7-7.

During use, and with additional reference to FIG. 7, a volume of feed solution 260 is dispensed into the containment region 210 of the outer chamber 202 (e.g., via the open top side 214), and a volume of liquid extractant 262 is dispensed into the flow region 236 of the inner chamber 204 via the conduit 224 (FIG. 5). To this end, as the liquid extractant 262 fills the inner chamber 204 from the bottom 228 (FIG. 5) up, the liquid extractant 262 flows about the frame 222. As the liquid extractant fill line (shown at a final level at 264 in FIG. 7) passes each of the vertical cross-bars 246b (FIG. 5), a portion of the liquid extractant 262 is forced through the corresponding fluid pathways 250. The reduced diameter associated with each of the fluid pathways 250 causes the liquid extractant 262 passing therethrough to have a non-laminar flow, in turn imparting a beneficial mixing action into the liquid extractant 262 as part of the filling operation during which extraction will occur as described below.

In addition to, in one embodiment, providing a tortuous/mixing flow pattern for the filling liquid extractant 262, the frame 222 further prevents the opposing side walls 226a, 226b from contacting one another in response to a pressure generated by the contained feed solution 260.

As shown in FIG. 7, a final fill level (shown at 266 in FIG. 7) of the feed solution 260 is preferably above the final liquid extractant fill level 264, thereby creating a desired pressure differential along the side walls 226a, 226b of the microporous membrane sleeve 220. The flow region 236 of the inner chamber 204 is immersed within the contained feed solution 260. In one embodiment, the top edges 234a, 234b extend above the feed solution fill level 266, such that the sleeve 220 need not be sealed. Alternatively, where the microporous membrane sleeve 220 is completely sealed, an entirety thereof can be immersed within the feed solution 260.

The filled volumes of the feed solution 260 and the liquid extractant 262 are then maintained for a predetermined dwell period, during which solute (not shown) in the feed solution 260 are extracted into the liquid extractant 262 across the microporous membrane sleeve 220. With the system 200 (and the system 30 previously described), an enhanced extraction interface surface area is provided to expedite the extraction process. More particularly, an extraction interface is provided at both of the side walls 226a, 226b.

The appropriate dwell period is a function of the particular feed solution 260 and liquid extractant 262, as well as an overall size of the system 200. In this regard, while the system 200 is depicted as having a single inner chamber 204, a plurality of inner chambers 204 can be provided, preferably isolated from one another by a separator plate (such as the separator plate 152 described with respect to the system 30 of FIG. 1). Typical dwell times will range from 1-15 minutes. Regardless, the system 200 is highly suitable for large scale extraction applications as previously described.

Figure 8:
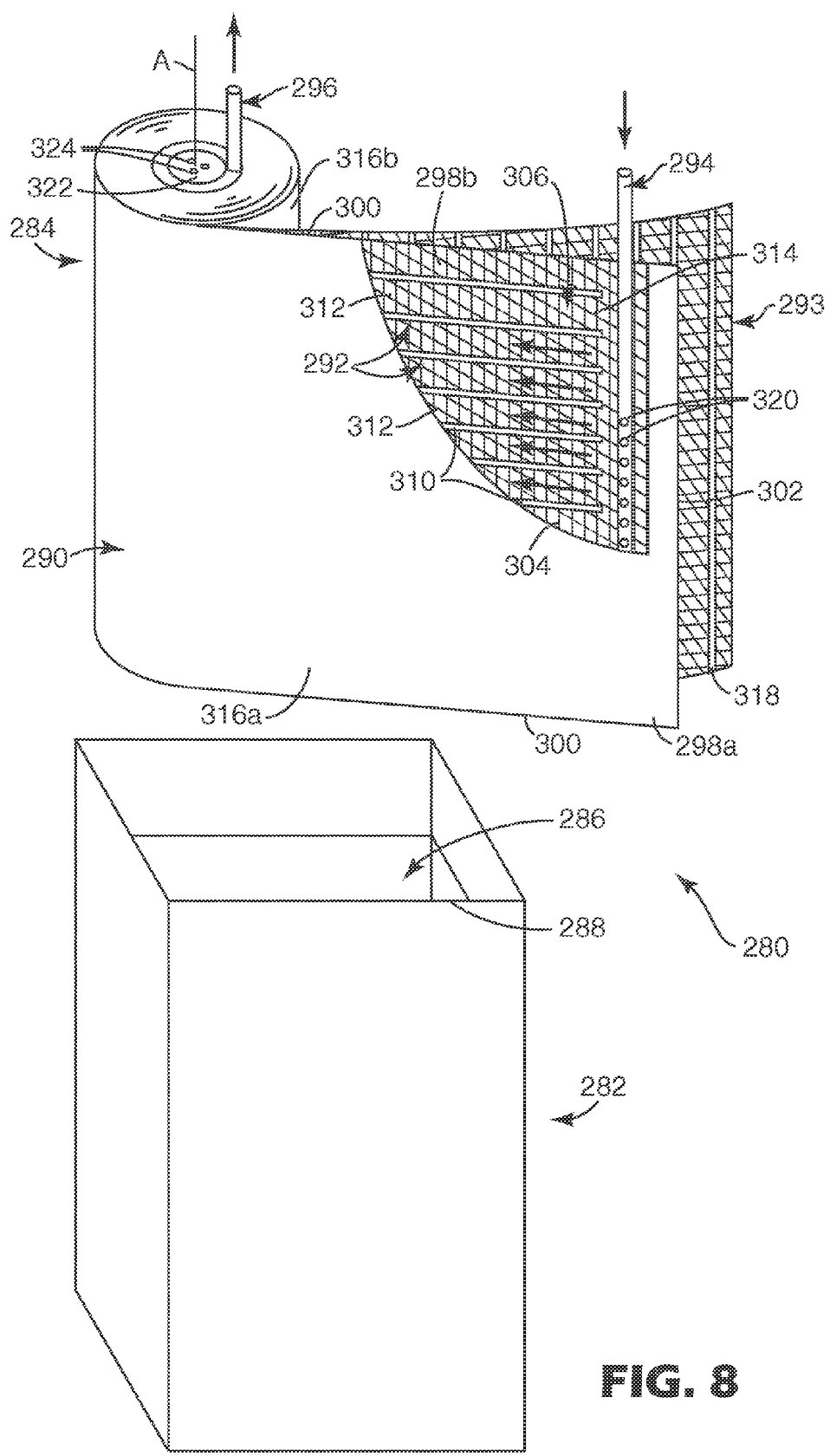
FIG. 8 is an exploded, perspective view of another alternative embodiment liquid-liquid extraction system in accordance with the present invention.

Yet another embodiment of the liquid-liquid extraction system 280 is provided in FIG. 8. The system 280 includes an outer chamber 282 and an inner chamber 284. The outer chamber 282 is adapted to contain a volume of feed solution (not shown), whereas the inner chamber 284 maintains a supply of liquid extractant (not shown). To this end, the inner chamber 284 is in the form of a wound roll, and provides a microporous membrane interface between the contained feed solution and the liquid extractant. Solute within the feed solution is transferred to the liquid extractant, which is subsequently removed from the inner chamber 284, either continuously or periodically.

The outer chamber 282 is a rigidly constructed tank sized to receive the inner chamber 284. To this end, the outer chamber 282 defines a containment region 286 and preferably forms an open top side 288.

The inner chamber 284 includes, in one embodiment, a microporous membrane sleeve 290, a frame insert 292 (referenced generally in FIG. 8), a separator wrap 293, an inlet conduit 294 and an outlet conduit 296 (shown partially in FIG. 8). Once again, the microporous membrane material useful for the sleeve 290 can assume any of the forms previously described, with the sleeve 290 preferably defined by opposing major side walls 298a, 298b sealed to one another along opposing sides 300, a leading edge 302, and a trailing edge (not shown in FIG. 8, but formed at a center of the wound roll). Interior surfaces of the side walls 298a, 298b can be lined with a protective screen or mesh material. Regardless, the sleeve 290 is an elongated body that is wrapped upon itself to form the inner chamber 284 as a wound roll. An internal flow region 306 (referenced generally in FIG. 8) is defined within the sleeve 290, and thus for the inner chamber 284, extending in a spiral fashion along the wound layers of the sleeve 290.

The frame insert 292, in one embodiment, includes a screen or mesh material 304 maintaining a plurality of ribs 310. The frame insert 292 is disposed within the sleeve 290, between the opposing side walls 298a, 298b. Upon final assembly, and with the embodiment of FIG. 8, each of the ribs 310 extends along a substantial length of the sleeve 290. Thus, upon final formation of the inner chamber 284 as a wound roll, the ribs 310 extend in a tangential fashion relative to a central axis A defined by the wound sleeve 290. A fluid pathway 312 is defined between adjacent ones of the ribs 310, with each fluid pathway 312 extending between, and fluidly connecting, the inlet and outlet conduits 294, 296, as described below. In this regard, each of the fluid pathways 312 define a leading end 314 that is fluidly open to the inlet conduit 294, and a trailing end (not shown) that is fluidly open to the outlet conduit 296. The ribs 310 are made from a sufficiently flexible material, for example polychloroprene, so as to not impede formation of the inner chamber 284 as a wound roll, and are secured to the screen 304 by any acceptable technique, such as sewing, heat sealing, etc., and promote a consistent spacing between the side walls 298a, 298b upon final assembly. In alternative embodiments, the ribs 310 can assume different forms, or can be eliminated such that the screen 304 alone is inserted within the sleeve 290.

The separator wrap 293 has a length and width substantially conforming with those of the sleeve 290, and is adapted to provide a slight separation between consecutive wraps of the sleeve 290 (e.g., the wrap layers 316a, 316b referenced in FIG. 8), thereby promoting flow of liquid between the wraps. In one embodiment, the separator wrap 293 includes a screen or mesh material within which a plurality of spaced arms 318 are secured. The arms 318 are positioned to extend in a vertical direction (i.e., parallel to the central axis A), such that liquid flows in a desired direction between wraps of the sleeve 290. The arms 318 are relatively thin, for example on the order of 0.03-0.1 inch (0.76-2.5 mm), so as to not overtly increase an overall diameter of the wound inner chamber 284. Alternatively, other constructions for the separator wrap 293 can be employed (e.g., a series of spaced material inserts between wraps of the sleeve 290) or eliminated entirely. Where provided, the separator wrap 293 is sufficiently flexible so as to not impede formation of the inner chamber 284 as a wound roll.

The inlet conduit 294 extends between an exterior of the sleeve 290 and the internal flow region 306 near the leading edge 302. The inlet conduit 294 forms a plurality of openings 320 positioned adjacent the leading end 314 of the fluid pathways 312 in accordance with one embodiment whereby the frame insert 292 includes the ribs 310. As shown in FIG. 8, the inlet conduit 294 may be slightly spaced from the fluid pathways 312, such that liquid (not shown) expelled from the inlet conduit 294, via the openings 320, is readily directed into each of the fluid pathways 312. In one embodiment, the inlet conduit 294 is fluidly connected to a source of liquid extractant (not shown) opposite the openings 320. With alternative embodiments in which the ribs 310 are not provided, the inlet conduit 294, and in particular the openings 320, are fluidly connected to the internal flow region 306 near the leading edge 302.

The outlet conduit 296 similarly extends between an exterior of the sleeve 290 and the internal flow region 306 near the trailing edge (not shown) of the sleeve 290. Once again, the "trailing edge" is defined at an inner winding or wrapped layer of the sleeve 290. The outlet conduit 296 forms a plurality of openings (not shown) positioned in fluid communication with the trailing ends (not shown) of the fluid pathways 312 in accordance with one embodiment where the frame insert 292 includes the ribs 310. Thus, liquid (not shown) flowing from the fluid pathways 312 is readily received by the outlet conduit 296 that in turn directs the collected liquid to a separate reservoir (not shown). With alternative embodiments in which the ribs 310 are not provided, the outlet conduit 296 is fluidly connected to the flow region 306 near the trailing edge.

During use, the outer chamber 282 is filled with a feed solution (not shown). The inner chamber 284 is placed within the outer chamber 282, such that the internal flow region 306 is immersed within the contained feed solution. In this regard, the separator wrap 293 maintains a slight spacing between individual wraps of the sleeve 290, such that the feed solution readily seeps between individual windings/wound layers of the inner chamber 284. In one embodiment, a core 322 of the inner chamber 284 is open and/or provides one or more bleed holes 324 that facilitate flowing of the feed solution within the core 322. A liquid extractant (not shown) is introduced into the inner chamber 284 via the inlet conduit 294. As shown by arrows in FIG. 8, the liquid extractant is forced from the openings 320 of the inlet conduit 294 to the fluid pathways 312. The fluid pathways 312, in turn, direct the liquid extractant in a spiral fashion along the wound layers of the sleeve 290 to the outlet conduit 296. The outlet conduit 296 collects and removes the liquid extractant from the sleeve 290. With alternative embodiments in which the ribs 310 are not included, the liquid extractant flows from the inlet conduit 294, along the internal flow region 306 in a spiral fashion, to the outlet conduit 296.

In one embodiment, a continuous flow of the liquid extractant (not shown) is established from the inlet conduit 294 to the outlet conduit 296. Alternatively, the sleeve 290 is filled with a desired volume of the liquid extractant, and maintained for a dwell period. Regardless, a microporous membrane extraction interface is established along both of the side walls 298a, 298b of the sleeve 290 between the contained feed solution (not shown) and the liquid extractant. Notably, extraction occurs along all wrapped layers of the wound roll inner chamber 284, such that a large extraction interface surface area is provided.

Figure 9:
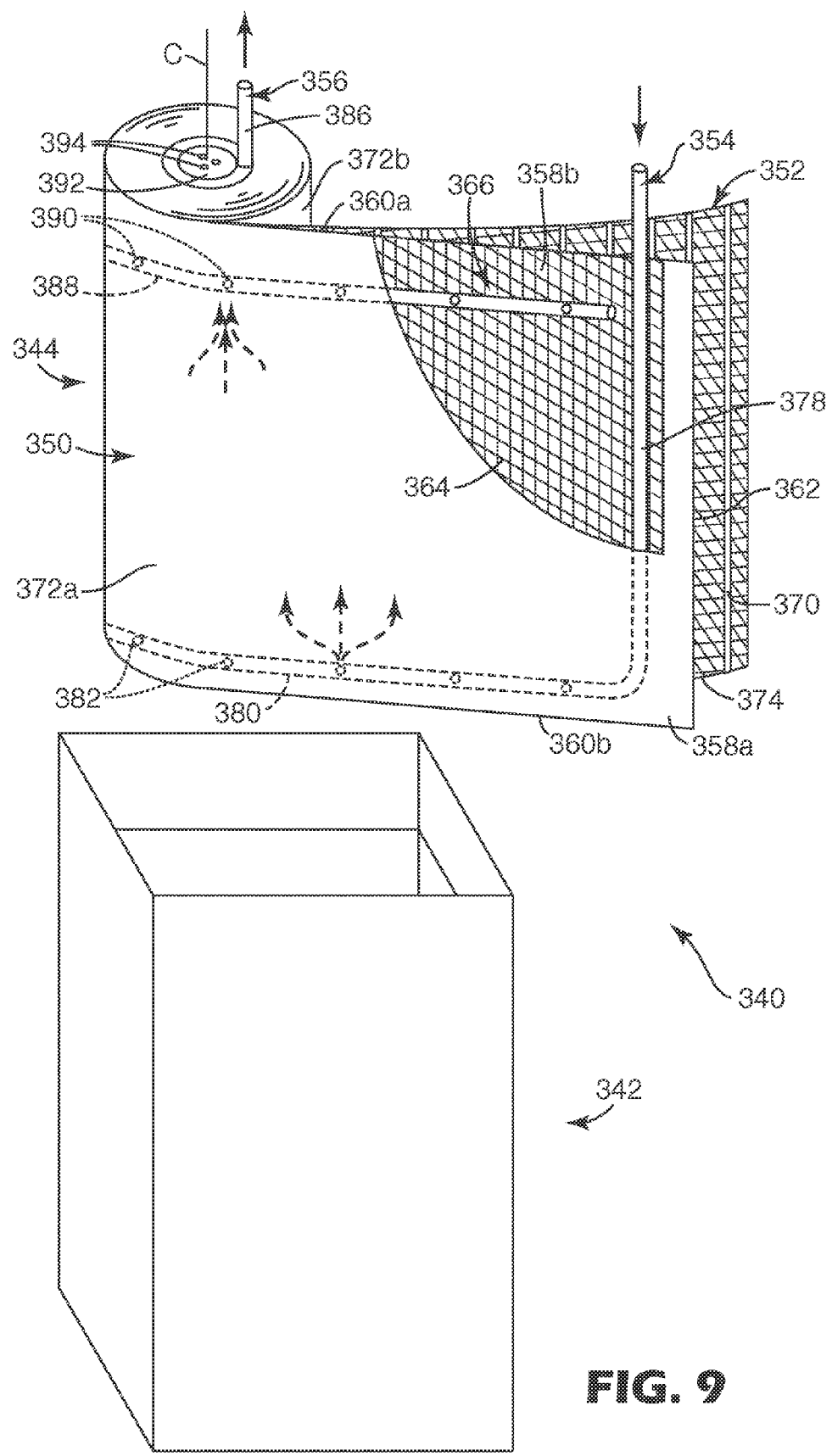
FIG. 9 is an exploded, perspective view of another alternative embodiment liquid-liquid extraction system in accordance with the present invention.

Yet another alternative embodiment liquid-liquid extraction system 340 is shown in FIG. 9. The system 340 is similar to the system 280 (FIG. 8) previously described, and includes an outer chamber 342 and an inner chamber 344. The outer chamber 342 is preferably identical to the outer chamber 282 (FIG. 8) previously described. The inner chamber 344 includes a microporous membrane sleeve 350, a separator wrap 352, an inlet conduit 354 and an outlet conduit 356. Once again, the microporous membrane material useful for the sleeve 350 can assume any of the forms previously described, with the sleeve 350 preferably defined by opposing major side walls 358a, 358b sealed to one another along opposing top and bottom sides 360a, 360b, a leading edge 362 and a trailing edge (not shown in FIG. 9, but formed at a center of the wound roll). Interior surfaces of the side walls 358a, 358b can be lined with a protective screen or mesh material (not shown). Regardless, the sleeve 350 is an elongated body that is wrapped upon itself to form the inner chamber 344 as a wound roll. An internal flow region 366 (referenced generally in FIG. 9) is defined within the sleeve 350, extending in a spiral fashion along the wound layers of the sleeve 350.

In one embodiment, a frame insert 364 is disposed within the sleeve 350 (between the opposing side walls 358a, 358b) that, in combination with portions of the inlet and outlet conduits 354, 356, provides an internal frame that serves to support the sleeve 350. The frame insert 364 can be a screen or mesh material, similar to that previously described with respect to the system 280 of FIG. 8. Alternatively, however, a more complex internal frame or rib structure can be provided with the frame insert 354, establishing fluid pathways (not shown) between the inlet and outlet conduits 354, 356, as described below. With this alternative construction the ribs (not shown) can extend in an axial fashion relative to a central axis C defined by the wound sleeve 350 upon final assembly. Effectively, the ribs can be akin to arms 370 provided by the separator wrap 352 described below.

The separator wrap 352 is similar to the separator wrap 293 (FIG. 8) previously described, and is adapted to ensure a slight spacing or separation between consecutive wraps of the sleeve 350 (e.g., the wrap layers 372a, 372b referenced in FIG. 9). The separator wrap 352 includes, in one embodiment, a screen or mesh material maintaining a plurality of the spaced arms 370. The separator wrap 352 can have a length and width substantially conforming to the sleeve 350. Again, other constructions can be employed for promoting spacing between wraps of the sleeve 350, or the separator wrap 352 can be eliminated.

The inlet conduit 354 extends between an exterior of the sleeve 350 and the internal flow region 366. In particular, the inlet conduit 354 includes a delivery section 378 and a release section 380 that defines a plurality of openings 382. The delivery section 378 is fluidly connected to a supply of liquid extractant (not shown). The release section 380 is positioned adjacent the bottom 360b of the sleeve 350, and extends along a substantial length of the sleeve 350. The openings 382 are preferably equidistantly spaced, on the order of one opening 382 every 1-20 inches (2.5-50.8 cm), and are in fluid communication with the internal flow region 366 (e.g., the leading ends 374 of the fluid pathways 372). Regardless, the inlet conduit 354, and in particular the release section 380, is preferably secured to the side walls 358a, 358b of the sleeve 350 in an appropriate fashion, such as by sewing, heat sealing, etc.

The outlet conduit 356 similarly extends between an exterior of the sleeve 350 and the internal flow region 366. The outlet conduit 356 includes a delivery section 386 and a collection section 388 that forms a plurality of openings 390. The collection section 388 is positioned adjacent the top 360a of the sleeve 350, and extends along a substantial length thereof. The openings 390 are preferably identical to the openings 382 provided with the inlet conduit 354, and are in fluid communication with the internal flow region 366 (and/or, where an internal frame structure is provided, with fluid pathways defined within the sleeve 350). The collection section 388 may be secured to the side walls 358a, 358b of the sleeve 350 in an appropriate fashion. The delivery section 386 is preferably fluidly connected to a reservoir (not shown), such that fluid flowing from the collection section 388 is dispensed to the reservoir via the delivery section 386.

During use, the outer chamber 342 is filled with a feed solution (not shown). The inner chamber 344 is placed within the outer chamber 342, such that the internal flow region 366 is immersed within the contained feed solution. In this regard, the separator wrap 352 provides a slight spacing between individual wraps of the sleeve 350, such that the feed solution readily seeps between individual windings/wound layers of the inner chamber 344. In one embodiment, a core 392 of the inner chamber 344 is open and/or provides one or more bleed holes 394 that facilitate flowing of the feed solution within the core 392. A liquid extractant (not shown) is introduced into the inner chamber 344 via the inlet conduit 354. As shown by arrows in FIG. 9, the liquid extractant is forced from the openings 382 of the release section 378 along a substantial length of the sleeve 350. The released liquid extractant is forced to flow upwardly to the collection section 388 of the outlet conduit 356 (represented by arrows in FIG. 9) as the internal flow region 366 is filled. With alternative embodiments in which the frame insert 364 includes ribs (not shown), the corresponding fluid pathways assist in directing the liquid extractant from the inlet conduit 354 to the collection section 388. Regardless, the liquid extractant is collected within the collection section 388, via the holes 390. The outlet conduit 356 collects and removes the liquid extractant from the sleeve 350 via the delivery section 386.

In one embodiment, a continuous flow of the liquid extractant (not shown) is established from the inlet conduit 354 to the outlet conduit 356. Alternatively, the sleeve 350 is filled with a desired volume of the liquid extractant, and maintained for a dwell period. Regardless, a microporous membrane extraction interface is established along both of the side walls 358a, 358b of the sleeve 350 between the contained feed solution (not shown) and the liquid extractant. Notably, extraction occurs along all wrapped layers of the wound roll inner chamber 344, such that a large extraction interface surface area is provided.

Figure 10:
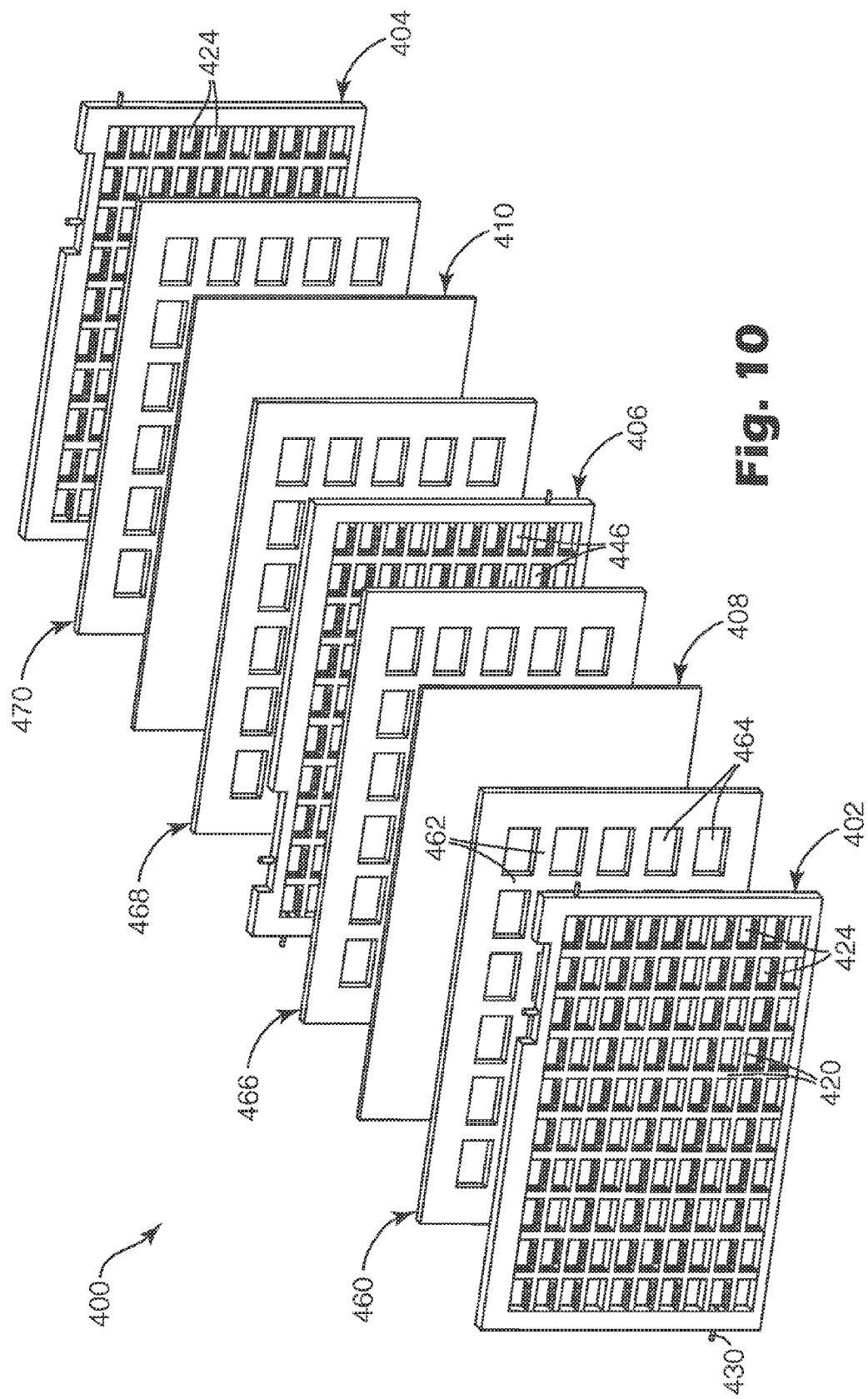
FIG. 10 is an exploded view of another alternative embodiment liquid-liquid extraction system in accordance with the present invention.

Yet another embodiment a liquid-liquid extraction system 400 in accordance with the present invention is shown in FIG. 10. The system 400 includes a first feed frame 402, a second feed frame 404, an extractant frame 406, a first microporous membrane 408, and a second microporous membrane 410. Details on the various components are provided below. In general terms, however, the first microporous membrane 408 is sealed between the first feed frame 402 and the extractant frame 406; whereas the second microporous membrane 410 is sealed between the second feed frame 404 and the extractant frame 406. During use, a liquid extractant (not shown) is dispensed into the extractant frame 406, and a feed solution (not shown) is dispensed into each of the first and second feed frames 402, 404. An extraction interface is established at the first microporous membrane 408 between liquid extractant within the extractant frame 406 and feed solution within the first feed frame 402, and at the second microporous membrane 410 between liquid extractant within the extractant frame 406 and feed solution within the second feed frame 404. Solute within the feed solution is transferred to the liquid extractant at these extraction interfaces.

Figure 11A:
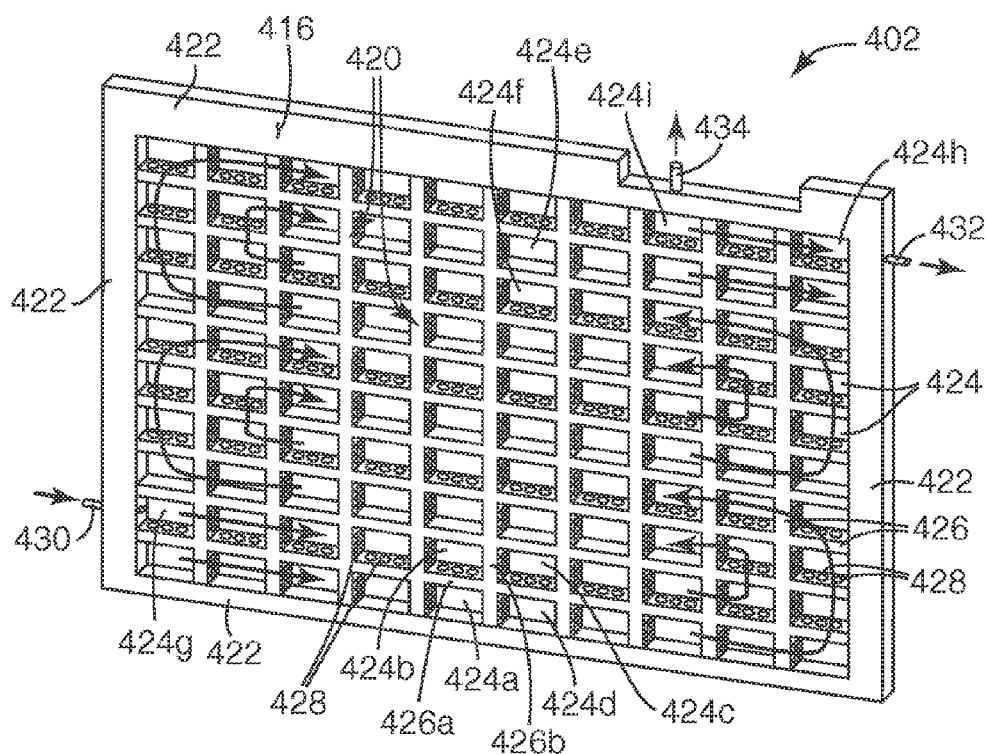
FIG. 11A is a perspective view of a feed frame portion of the system of FIG. 10.

The first feed frame 402 is shown in greater detail in FIG. 11A, it being understood that the feed frames 402, 404 are preferably identical. The feed frame 402 provides, in one embodiment, a lattice-like structure, defining a first or front face 416 and a second or back face (hidden in FIG. 11A). A plurality of cross-bars 420 extends within an outer frame structure 422. Though interconnected, the cross-bars 420 create a plurality of open regions or chambers 424 that are open relative to one or both of the front face 416 and the back face. Adjacent ones of several of the open regions 424, otherwise defined by a cross-bar section 426, are fluidly connected to one another by one or more fluid pathways 428 formed through the commonly-shared cross-bar section 426. For example, the open regions 424 include first, second, third and fourth open regions 424a-424d. A cross-bar section 426a defines a portion of the first and second open regions 424a, 424b, and includes fluid pathways 428 fluidly connecting the first and second open regions 424a, 424b. Similarly, a cross-bar section 426b defining portions of the second and third open regions 424b, 424c includes fluid pathways 428 fluidly connecting the second and third open regions 424b, 424c. The third and fourth open regions 424c, 424d; and the first and fourth open regions 424a, 424d are similarly fluidly connected by fluid pathways 428. While three of the fluid pathways 428 are shown for many of the cross-bar sections 426, any other number, either greater or lesser, is acceptable.

Notably, not every adjacent pair of open regions 424 need be fluidly connected by a fluid pathway. F7 or example, adjacent open regions 424e, 424f are not directly fluidly connected to one another. Alternatively, fluid pathways can be provided within every cross-bar section. Regardless, the feed frame 402 includes an inlet port 430, a first outlet port 432, and a second outlet port 434. The inlet port 430 is fluidly connected to the open region 424g; the first outlet port 432 is fluidly connected to the open region 424h; and the second outlet port 434 is fluidly connected to the open region 424i. With this one preferred construction, the open regions 424/fluid pathways 428 define a tortuous flow path between the inlet port 430 and the outlet ports 432, 434, as represented by arrows in FIG. 11A.

In a preferred embodiment, the feed frames 402, 404 are formed of a rigid, non-corrosive material such as aluminum, stainless steel, or rigid polyolefin, such as, for example, high density polyethylene. As described below, during use, a feed solution (not shown) is preferably forced through the feed frames 402, 404 at a relative high pressure. Thus, the feed frames 402, 404 are constructed of a material and thickness able to maintain integrity under relatively high stress.

Figure 11B:
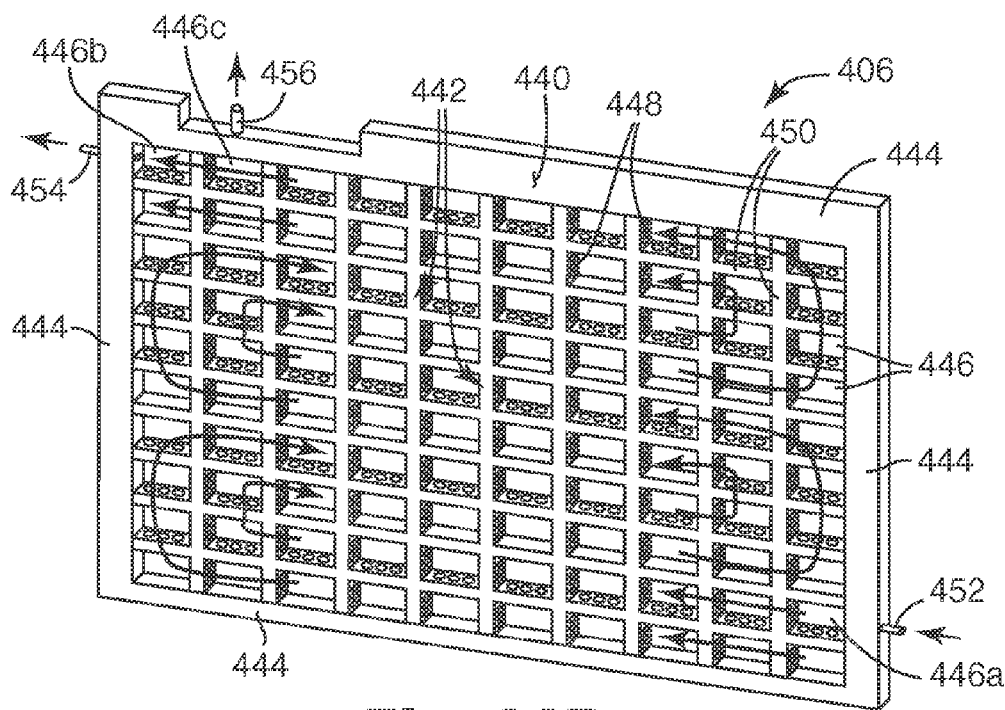
FIG. 11B is a perspective view of an extractant frame portion of the system of FIG. 10.

The extractant frame 406 is shown in greater detail in FIG. 11B. The extractant frame 406 is virtually identical to the feed frames 402, 404 (FIG. 11A) previously described, and provides a lattice-like structure defining a first or front face 440 and a second or back face (hidden in the views of FIGS. 10 and 11B). A plurality of cross-bars 442 extends within an outer frame structure 444, and defines a plurality of open regions or chambers 446. The open regions 446 are, in one embodiment, open relative to both the front face 440 and the back face. Further, one or more fluid pathways 448 are formed by cross-bar sections 450 otherwise commonly shared by adjacent ones of the open regions 446. Once again, in one embodiment, not every cross-bar section 450 provides a fluid pathway 448. Regardless, a tortuous flow path is defined between an inlet port 452 and outlet ports 454, 456 that are otherwise fluidly connected to open regions 446a, 446b, 446c, respectively.

Returning to FIG. 10, the microporous membranes 408, 410 are preferably identical, sized in accordance with a size of the frames 402-406. Any of the microporous membrane materials previously described can be employed as the microporous membranes 408, 410.

Assembly of the system 400 includes sealing the first microporous membrane 408 between the first feed frame 402 and the extractant frame 406. In this regard, a gasket 460 can be secured against the back face (hidden in FIG. 10) of the first feed frame 402. The gasket 460 is made of an appropriate elastomeric material, such as polychloroprene or neoprene, suitable for sealing the front face of the feed frame 402. The gasket 460 includes a plurality of extensions 462 that define a plurality of apertures 464. The size and location of the extensions 462 corresponds with several of the cross-bars 420 of the first feed frame 402, such that upon final assembly, the gasket extensions 462 are aligned with the cross-bars 420, and the apertures 464 are generally aligned with corresponding open regions 424. Thus, at least portions of the open regions 424 remain exposed upon assembly of the gasket 460. Similar gaskets 466, 468, 470 can similarly be provided, and secured to, the extractant frame 406 and the second feed frame 404 as illustrated in FIG. 10.

The first microporous membrane 408 is positioned between the first feed frame 402/gasket 460 and the extractant frame 406/gasket 466. In this regard, the back face (hidden in FIG. 10) of the first feed frame 402 and the front face 440 of the extractant frame 406 face one another, and the open regions 424, 446 are aligned. Further, at least portions of each of the open regions 424, 446 remain exposed relative to the first microporous membrane 408, such that an extraction interface can be established across the first microporous membrane 408. Similarly, the second microporous membrane 410 is positioned between the second frame 404/gasket 470 and the extractant frame 406/gasket 468. The front face 416 of the second feed frame 404 and the back face (hidden in FIG. 10) of the extractant frame 406 face one another, and the open regions 424, 446 are aligned. At least portions of the open regions 424, 446 are exposed relative to the second microporous membrane 410, such that an extraction interface can be established across the second microporous membrane 410.

Figure 12:
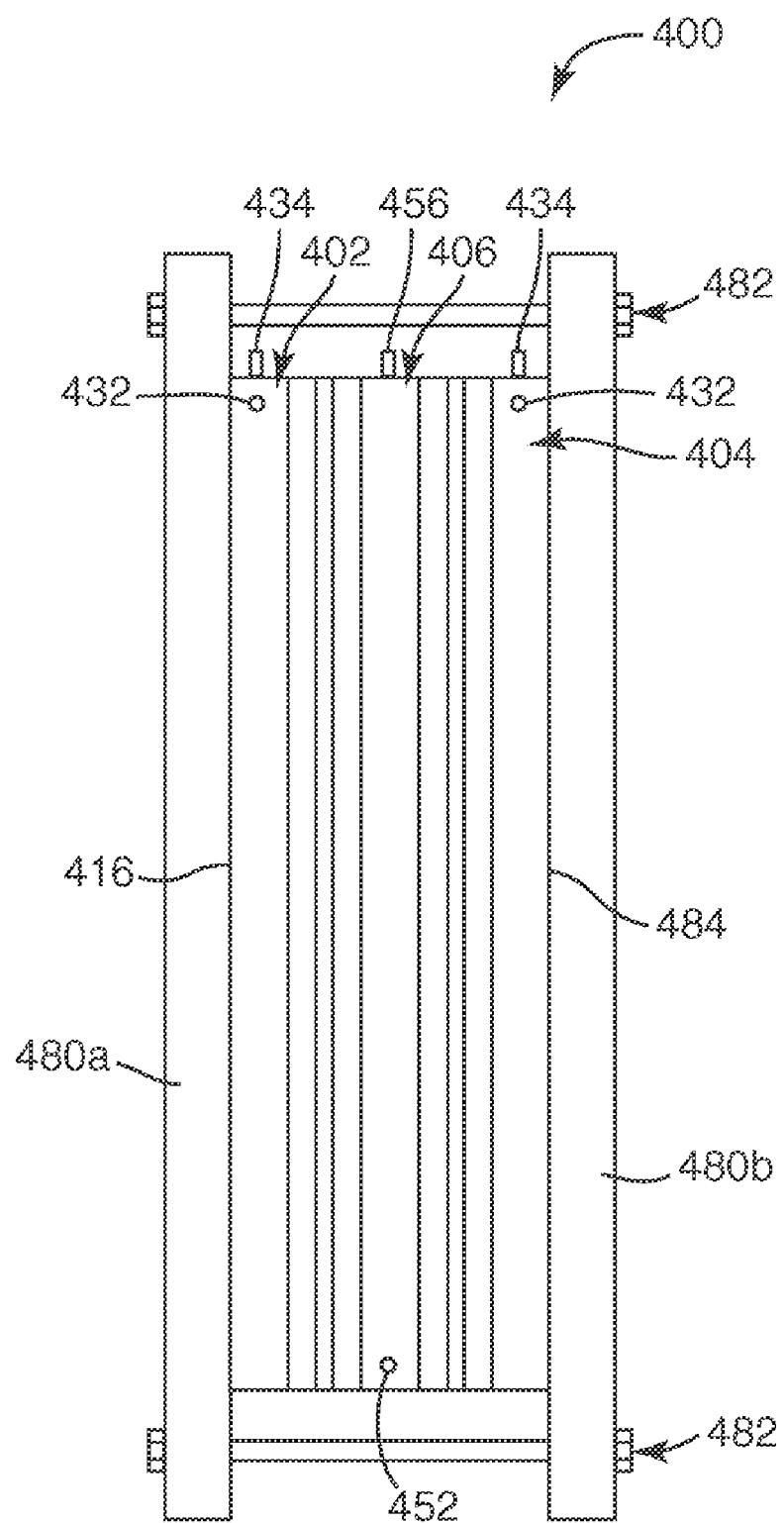
FIG. 12 is a side view of the system of FIG. 10 upon final assembly.

With additional reference to FIG. 12, the so-assembled frames 402-406 are clamped between plates 480a, 480b, such as by bolts 482, although other forms of attachment are equally acceptable. The first plate 480a seals the front face 416 (referenced generally in FIG. 12) of the first feed frame 402, whereas the second plate 480b seals the back face (referenced generally at 484 in FIG. 12) of the second feed frame 404. To this end, an additional sealing material (e.g., a gasket) can be positioned between the plates 480a, 480b and the corresponding feed frame 402, 404 to ensure a fluid tight seal.

During use, a feed solution (not shown) is forced into the inlet port 430-(hidden in the view of FIG. 12) of the first and second feed frames 402, 404, and a liquid extractant (not shown) is forced into the inlet port 452 of the extractant frame 406. The feed solution and liquid extractant flow through the tortuous fluid paths defined by the respective frames 402-406, imparting a mixing action into the respective liquid flows. In one embodiment, the feed solution and the liquid extractant are continuously flowed or recirculated through the corresponding frames 402-406, with the liquid exiting the corresponding frame 402-406 via the respective first outlet port 432, 454. Alternatively, a fill and release methodology can be employed, whereby the feed frames 402, 404 are filled with a volume of feed solution and the extractant frame 406 is filled with a volume of liquid extractant. The feed solution and liquid extractant volumes are held within the corresponding frames 402-406 for a dwell period, and then released. In this regard, the second outlet ports 434, 456 are positioned at a same side of each of the frames 402-406, facilitating simultaneous, gravity-induced release or draining of the contained volumes from the frames 402-406 (i.e., when the system 400 is turned upside down relative to the orientation of FIG. 12). Further, the second outlet ports 434, 456 can remain open (fully or partially) during a filling or flowing operation, allowing entrained air to be expelled from the respective frame 402-406.

Regardless of whether a continuous flow or fill and release technique is employed, feed solution (not shown) within the first feed frame 402 contacts the first microporous membrane 408 at the open regions 424, and feed solution (not shown) within the second feed frame 404 contacts the second microporous membrane 410 at the open regions 424. Similarly, liquid extractant (not shown) within the extractant frame 406 contacts the first and second microporous membrane 408, 410 at the open regions 446. Because the open regions 424, 446 are aligned, an extraction interface is established across the first and second microporous membranes 408, 410, causing solute within the feed solution (otherwise contained within both feed frames 402, 404) to transfer to the liquid extractant.

With the one embodiment in which the feed solution (not shown) and liquid extractant (not shown) are continuously recirculated through the respective frames 402-406, a desired pressure differential is maintained across the porous membranes 408, 410 by controlling a flow rate of the feed solution and/or the liquid extractant. With reference to FIG. 10, the inlet port 430 of the feed frames 402, 404 are positioned opposite the inlet port 452 of the extractant frame 406. Thus, a general fluid flow direction in the feed frames 402, 404 is opposite that of the extractant frame 406, creating a greater shear between the feed solution and the liquid extractant at the corresponding liquid-liquid extraction interface.

While the system 400 of FIG. 10 has been described as including two of the feed frames 402, 404 and a single extractant frame 406, multiple other configurations are also acceptable. For example, a single feed frame and a single extractant frame can be employed. Alternatively, a multiplicity of feed frames and extractant frames can be provided (e.g., on the order of 10 or more). To this end, there can be more feed frames than extraction frames, more extraction frames than feed frames, or an equal number of both. However, each feed frame is positioned to face an extractant frame, and vice-versa.

Figure 13:
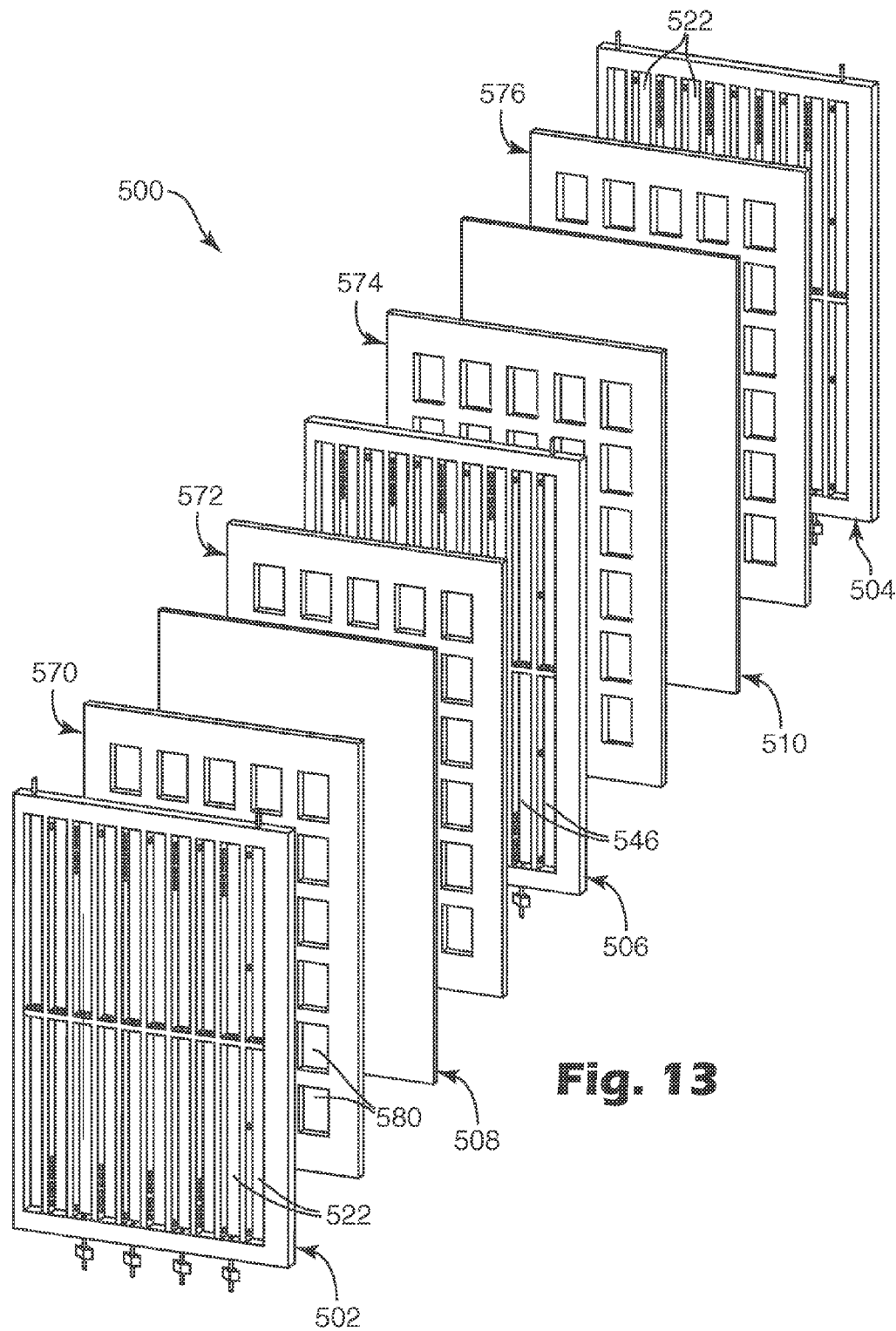
FIG. 13 is an exploded, perspective view of another alternative embodiment liquid-liquid extraction system in accordance with the present invention.

Yet another alternative embodiment liquid-liquid extraction system 500 is illustrated in FIG. 13. The system 500 is highly similar to the system 400 (FIG. 10) previously described, and includes a first feed frame 502, a second feed frame 504, an extractant frame 506, a first microporous membrane 508, and a second microporous membrane 510. Details on the various components are provided below. In general terms, however, the first microporous membrane 508 is sealed between the first feed frame 502 and the extractant frame 506; whereas the second microporous membrane 510 is sealed between the second feed frame 504 and the extractant frame 506. During use, a liquid extractant (not shown) is dispensed into the extractant frame 506, and a feed solution (not shown) is dispensed into each of the first and second feed frames 502, 504. An extraction interface is established at the first microporous membrane 508 between liquid extractant within the extractant frame 506 and feed solution within the first feed frame 502, and at the second microporous membrane 510 between liquid extractant within the extractant frame 506 and feed solution within the second feed frame 504. Solute within the feed solution is transferred to the liquid extractant at these extraction interfaces.

The first feed frame 502 is shown in greater detail in FIG. 14A, it being understood that the feed frames 502, 504 are identical in accordance with one embodiment. The feed frame 502 can provide a lattice-like structure, defining a first or front face 516 and a second or back face (hidden in the view of FIG. 14A). A plurality of cross-bars 518 extends within an outer frame structure 520, defining a plurality of open regions or chambers 522. The open regions 522 are open or exposed relative to the front face 516 and the back face. As compared to the feed frame 402 (FIG. 11A) previously described, the feed frame 502 includes a lesser number of the cross-bars 518, and thus a lesser number of the open regions 522 (although the open regions 522 of the feed frame 502 are larger in cross-sectional area as compared to the open regions 424 (FIG. 11A) of the feed frame 402). Further, while one or more fluid pathways 524 are formed in various cross-bar sections 526, a more defined flow path is provided with the feed frame 502. In particular, the fluid pathways 524 are arranged to define a relatively serpentine-like flow path, as shown by arrows in FIG. 14A.

The feed frame 502 further includes an inlet port 530, a primary outlet port 532, and secondary outlet ports 534a-534d. Each of the ports 530-534d is fluidly connected to a respective one of the open regions 522. For reasons made clear below, each of the secondary outlet ports 534a-534d include, in one embodiment, a separate control valve 536 adapted to selectively control opening and closing of the corresponding secondary outlet port 534a-534d.

The extractant frame 506 is shown in greater detail in FIG. 14B, and is, in one embodiment, essentially identical to the feed frames 502, 504 (FIG. 14A). Thus, the extractant frame 506 can provide a lattice-like structure, defining a first or front face 540 and a second or back face (hidden in the view of FIG. 14B). A plurality of cross-bars 542 extends within an outer frame structure 544, defining a plurality of open regions or chambers 546. The open regions 546 are open or exposed relative to the front face 540 and the back face. One or more fluid pathways 548 are formed in various cross-bar sections 550, arranged to define a relatively serpentine-like flow path, as shown by arrows in FIG. 14B. Finally, the extractant frame 506 includes an inlet port 554, a primary outlet port 556, and secondary outlet ports 558a-558d, each fluidly connected to a respective one of the open regions 546. As with the feed frame 502, each of the secondary outlet ports 558a-558d are provided with a separate control valve 560.

Returning to FIG. 13, the microporous membranes 508, 510 are preferably identical, sized in accordance with a size of the frames 502-506. Any of the microporous membrane materials previously described can be employed as the microporous membranes 508, 510.

Assembly of the system 500 includes sealing the first microporous membrane 508 between the first feed frame 502 and the extractant frame 506. In this regard, a gasket 570 can be secured against the back face (hidden in FIG. 13) of the first feed frame 502, and a gasket 572 can be secured against the front face 540 of the extractant frame 506. Similarly, a gasket 574 can be secured against the back face (hidden in FIG. 14) of the extractant frame 506, and a gasket 576 can be secured against the front face 516 of the second feed frame 504. The gaskets 570-576 are similar to those previously described with respect to the system 400 (FIG. 10), and can be sized in accordance with a size of the respective frames 502-506.

Once again, the gaskets 570-576 each form a plurality of apertures 580 that, upon final assembly to the respective frame 502-506, at least partially expose the corresponding open regions 522, 546. Thus, upon final assembly, at least portions of the open regions 522 of the first feed frame 502 are exposed relative to the first microporous membrane 508; at least portions of the open regions 546 of the extractant frame 506 are exposed relative to the first and second microporous membranes 508, 510; and at least portions of the open regions 522 of the second feed frame 504 are exposed relative to the second microporous membrane 510. Because the open regions 522, 546 are aligned upon final assembly, an extraction interface across the first and second microporous membranes 508, 510 can be established.

Figure 15:
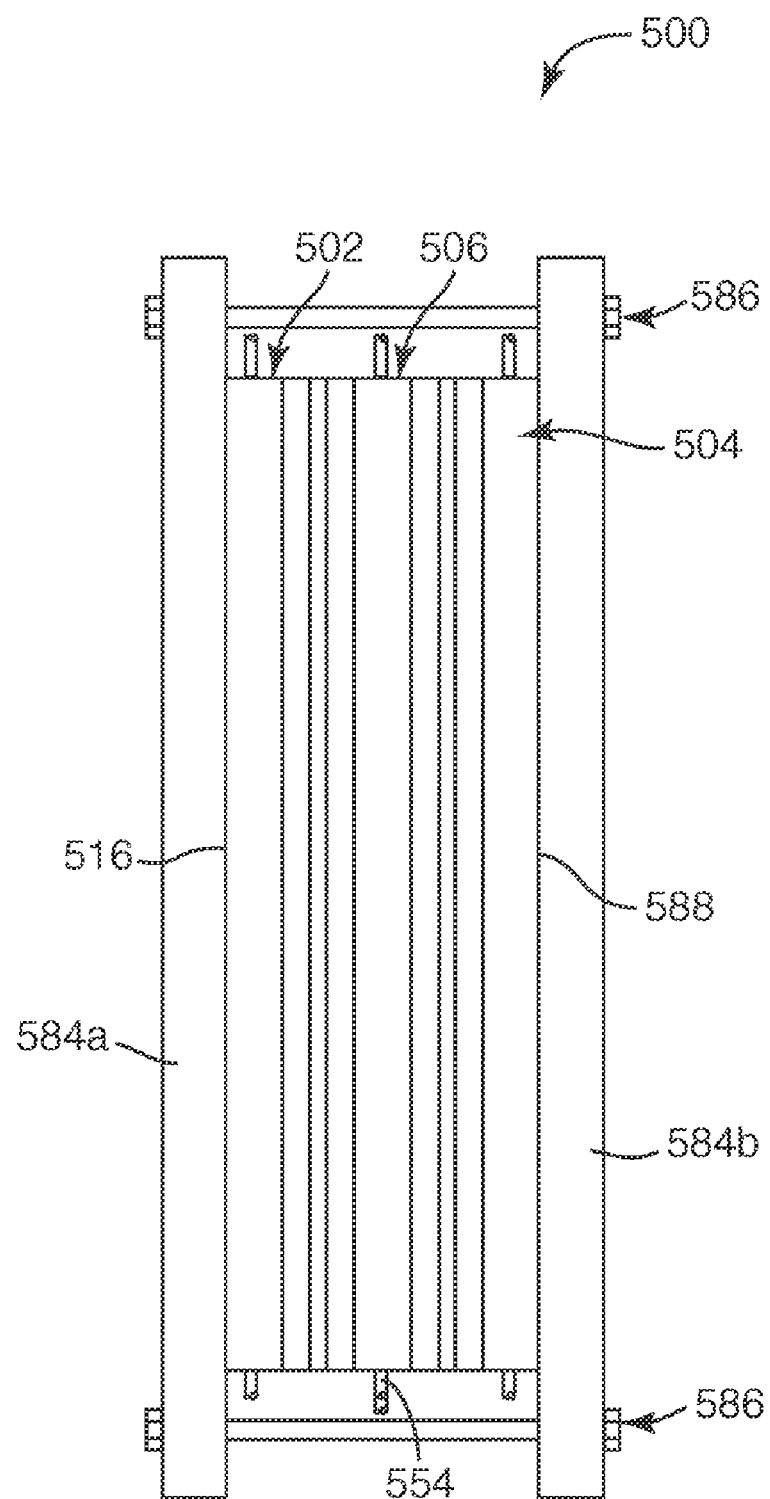
FIG. 15 is a side view of the system of FIG. 13 upon final assembly.

With additional reference to FIG. 15, the so-assembled frames 502-506 are clamped between plates 584a, 584b, such as by bolts 586, although other forms of attachment are equally acceptable. The first plate 584a seals the front face 516 (referenced generally in FIG. 15) of the first feed frame 502, whereas the second plate 584b seals the back face (referenced generally at 588 in FIG. 15) of the second feed frame 504. To this end, an additional sealing material (e.g., a gasket) can be positioned between the plates 584a, 584b and the corresponding feed frame 502, 504 to ensure a fluid tight seal.

During use, a feed solution (not shown) is forced into the inlet port 530 (FIG. 14A) of the first and second feed frames 502, 504, and a liquid extractant (not shown) is forced into the inlet port 554 of the extractant frame 506. The feed solution and liquid extractant flow through the fluid paths defined by the respective frames 502-506, imparting a mixing action into the respective liquid flows. In one embodiment, the feed frames 502, 504 are filled with a desired volume of feed solution and the extractant frame 506 is filled with a desired volume of liquid extractant. The primary outlet port 532 of the first feed frame 502, the primary outlet port 532 of the second feed frame 504 and/or the primary outlet port 556 of the extractant frame 506 can remain fully or partially open during a portion or entirety of the filling operation to allow entrained air to escape from the corresponding frame 502, 504 and/or 506. The contained volumes are maintained for a dwell period, during which solute in the feed solution is extracted into the liquid extractant via the first and second microporous membranes 508, 510. Upon completion of the dwell period, the control valves 536, 560 are opened, and the contained volumes allowed to drain from the frames 502-506 via the secondary outlet ports 534a-534d, 558a-558d.

Alternatively, the feed solution and/or the liquid extractant can be continuously flowed or recirculated through the respective frames 502-506. To this end, the feed solution is removed (e.g., pumped) from the first and second feed frames 502, 504 via the respective primary outlet ports 532, whereas the liquid extractant is removed (e.g., pumped) from the extractant frame 506 via the primary outlet port 556.

While the system 500 of FIG. 13 has been described as including two of the feed frames 502, 504 and a single extractant frame 506, multiple other configurations are also acceptable. For example, a single feed frame and a single extractant frame can be employed. Alternatively, a multiplicity of feed frames and extractant frames can be provided (e.g., on the order of 10 or more). To this end, there can be more feed frames than extraction frames, more extraction frames than feed frames, or an equal number of both. However, each feed frame is positioned to face an extractant frame, and vice-versa.

Figure 16:
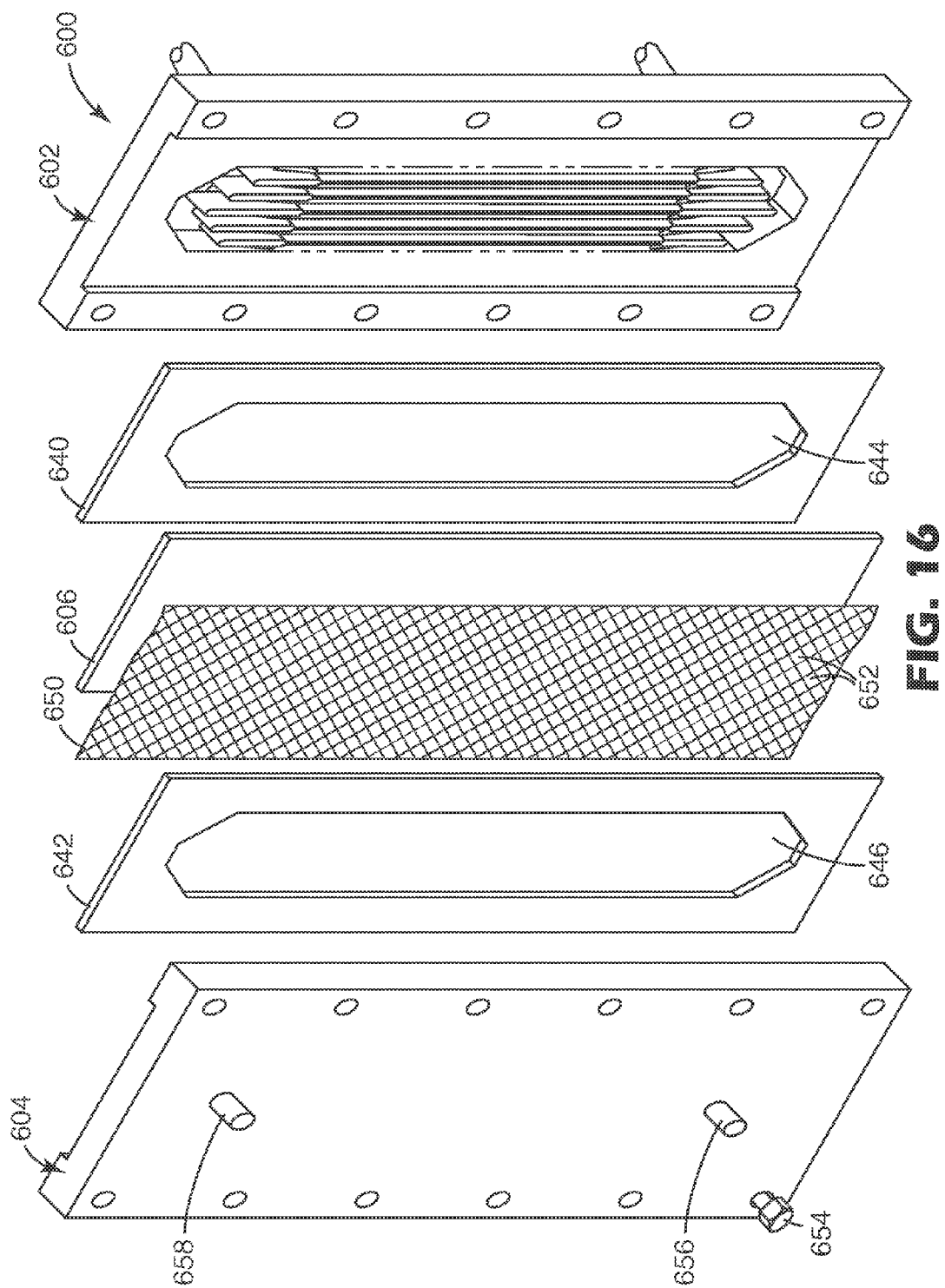
FIG. 16 is an exploded, perspective view of another alternative embodiment liquid-liquid extraction system in accordance with the present invention.

Yet another alternative embodiment liquid-liquid extraction system 600 in accordance with the present invention is illustrated in FIG. 16. The system 600 generally includes a feed frame 602, an extractant frame 604 and a microporous membrane 606. Details on the various components are provided below. In general terms, however, the microporous membrane 606 is sealed between the frames 602, 604. During use, a feed solution (not shown) is introduced into the feed frame 602, and a liquid extractant (not shown) is introduced into the extractant frame 604. An extraction interface is established across the microporous membrane 606 between the feed solution in the feed frame 602 and the liquid extractant in the extractant frame 604. Solute within the feed solution is extracted to the liquid extractant along the extraction interface.

Figure 17:
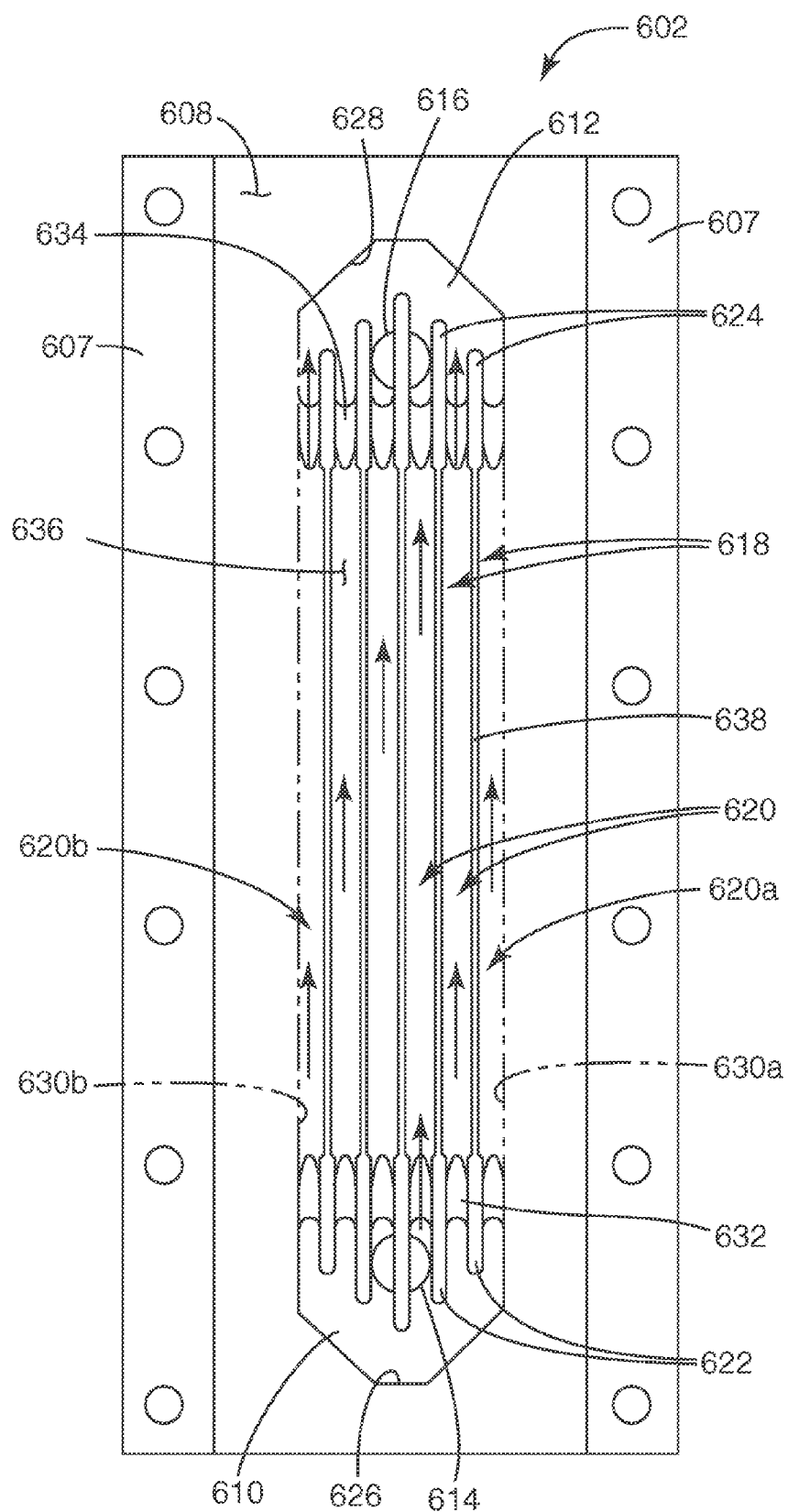
FIG. 17 is a front view of a frame component of the system of FIG. 16.

The feed frame 602 and the extractant frame 604 are, in one embodiment, identical. With additional reference to FIG. 17 otherwise illustrating the feed frame 602 in greater detail, the feed frame 602 is a plate-like body forming opposing shoulders 607 extending from a front face 608 thereof. An inlet region 610 and an outlet region 612 are defined as recesses in the front face 608. Inlet and outlet ports 614, 616 are formed in the frame 602, fluidly connected to the inlet region 610 and the outlet region 612, respectively. Further, a plurality of ribs 618 are formed as outward projections relative to the front face 108, extending in a linear fashion to define a plurality of channels 620. Each rib 618 includes opposing first and second end sections 622, 624 that are offset from a respective end wall 626, 628 otherwise defining a portion of the inlet region 610 and the outlet region 612, respective. With this configuration, each of the channels 620 are similarly defined by opposing inlet end 632 and outlet end 634 that terminate in the inlet region 610 and the outlet region 612, respectively. Each of the channel inlet ends 632 is thus fluidly connected to the inlet port 614, and each of the channel outlet ends 634 is fluidly connected to the outlet port 616. Notably, FIG. 17 illustrates outermost channels 620a, 620b as being defined between outermost ribs 618 and seal lines 630a, 630b, respectively. In one embodiment, the seal lines 630a, 630b are not physically formed by the frame 602. Instead, upon final assembly in which a gasket (not shown in FIG. 17) is pressed against the front face 608, the gasket will seal against the front face 608 along the seal lines 630a, 630b, offset from the corresponding outermost rib 618. This construction, in turn, establishes the channels 620a, 620b. Thus, relative to the view of FIG. 17 otherwise depicting the frame 602 alone, the seal lines 630a, 630b are imaginary.

With the above-described construction, the channels 620 provide fluid pathways between the inlet port 614 and the outlet port 616. In one embodiment, the frame 602 is adapted to promote a relatively high flow rate through the channels 620 with minimal pressure loss. To this end, the frame 602, and in particular the surfaces otherwise defining the channels 620, is formed of a highly smooth material, such as aluminum. The channels 620 are relatively small in terms of width and depth, having in one embodiment a width in the range of 0.4-1.4 cm, for example 0.9 cm. Further, and in accordance with one embodiment, the channels 620 have a depth in the range of 0.02-0.15 cm, for example 0.08 cm. In addition, a bottom surface 636 of each of the channels 620 gradually tapers inwardly (relative to the plane of FIG. 17) at the inlet and outlet ends 632, 634 thereof and into the inlet and outlet regions 610, 612, defining a descending taper in the range of 0.1-1.0 cm over a 2.5 cm distance, for example 0.5 cm over a 2.5 cm distance. Finally, in accordance with one embodiment, the first and second end sections 622, 624 of each of the ribs 618 have a greater width than a central section 638 thereof. For example, the central section 638 of each of the ribs 618 has a width in the range of 0.05-0.1 cm, for example 0.08 cm; whereas the first and second end sections 622, 624 have a width in the range of 0.1-0.8 cm, for example 0.3 cm. While preferred features and dimensions have been ascribed for the various feed frame 602 components, other configurations are also acceptable. For example, other dimensions can be employed, and certain features (e.g., taper of the channel ends 632, 634; varying width of the ribs 618; etc.) can be modified or even eliminated.

Returning to FIG. 16 the microporous membrane 606 is sized in accordance with a size of the frames 602, 604. Any of the microporous membrane materials previously described can be employed as the microporous membrane 606.

In one embodiment, the system 600 further includes a gasket 640 associated with the feed frame 602 and a gasket 642 associated with the extractant frame 604. The gaskets 640, 642 are formed of an appropriate elastomeric material, such as polychloroprene or neoprene, and are sized in accordance with a size of the corresponding frame 602, 604. Each of the gaskets 640, 642 defines a central opening 644, 646 that mimics a shape of the front face 608 of the frames 602, 604. Thus, upon assembly of the gasket 640 to the front face 608 of the feed frame 602, and of the gasket 642 to the front face (hidden in FIG. 16) of the extractant frame 604, at least portions of the channels 620 formed therein remain open.

Finally, in one embodiment, a screen or mesh material 650 may be provided with the extractant frame 604, positioned between the gasket 642 and the microporous membrane 606. The screen 650 defines a plurality of relatively large openings 652 (e.g., on the order of 0.3 cm by 0.3 cm square openings), and is formed of a relatively strong material, such as polyethylene. The screen 650 provides support for the microporous membrane 606, facilitating placement of a large pressure/force across the membrane 606. As described below, the screen 650 further provides a slight impediment to uniform liquid flow along a surface of the microporous membrane 606, imparting a mixing action into the flow.

Figure 18:
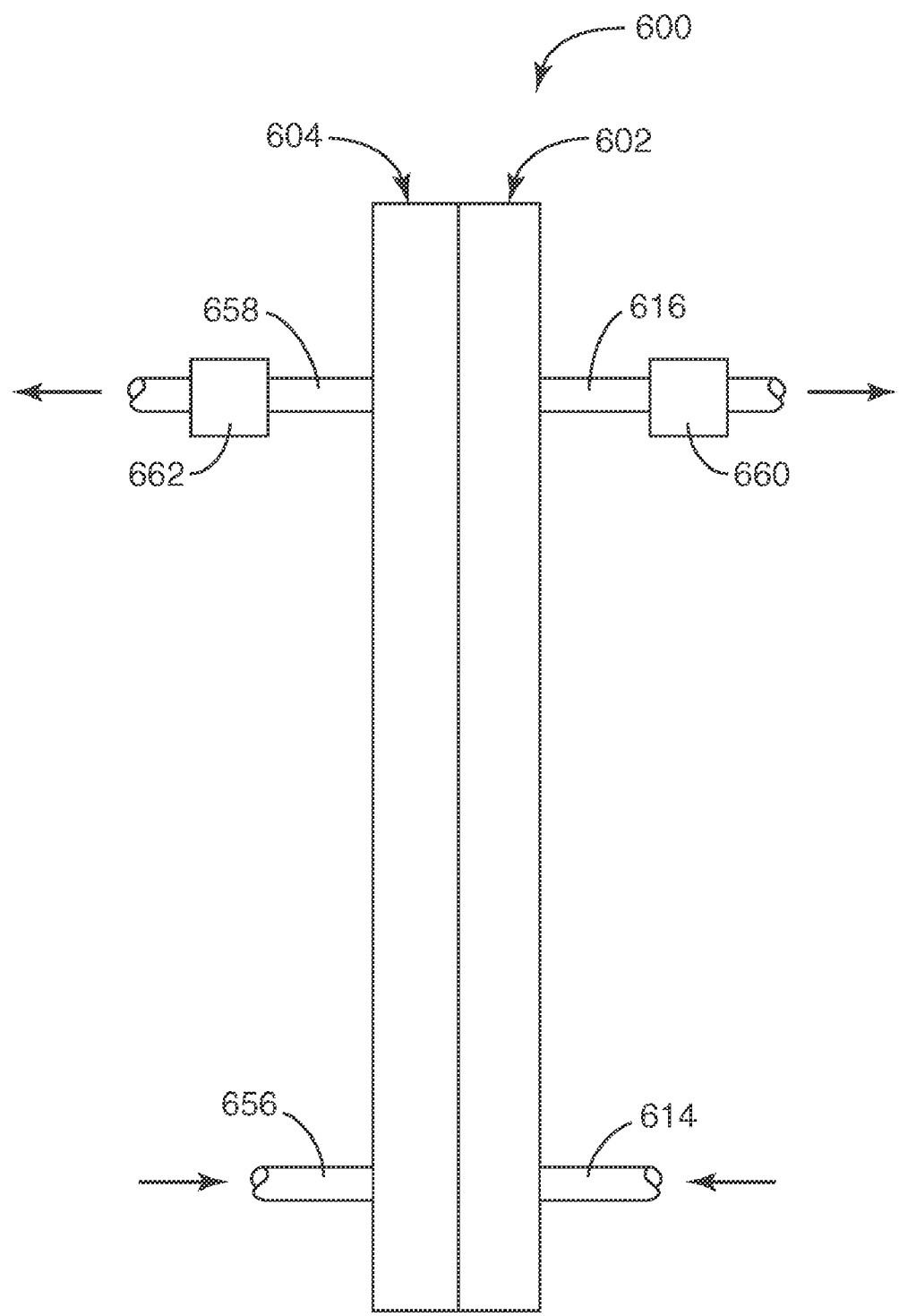
FIG. 18 is a side view of the system of FIG. 16 upon final assembly.

Assembly of the system 600 includes arranging the feed frame 602, the gasket 640, the microporous membrane 606, the screen 650, the gasket 642, and the extractant frame 604 in the order shown in FIG. 16. Because the frames 602, 604 are virtually identical, the ribs 618 and the channels 620 of the frames 602, 604 are aligned. The frames 602, 604 (and thus the various components positioned therebetween) are secured to one another, such as by bolts 654. With additional reference to FIG. 18, the assembled system 600 is highly compact, with the ports 614, 616 of the feed frame 602 extending opposite inlet and outlet ports 656, 658 of the extractant frame 604. In one embodiment, a control valve 660 is associated with the outlet port 616 of the feed frame 602, and a control valve is associated with the outlet port 658 of the extractant frame 604.

During use, feed solution (not shown) is continuously circulated through the feed frame 602 via the inlet and outlet ports 614, 616. For example, the inlet and outlet ports 614, 616 can be fluidly connected to a feed solution reservoir (not shown), and a pump employed to continuously circulate the feed solution through the feed frame 602. A desired fluid pressure for the feed solution through the feed frame 602 can be maintained by an appropriate valve system (including, for example, the control valve 660), which can include a pressure gage. Similarly, liquid extractant (not shown) is continuously circulated through the extractant frame 604 via the inlet and outlet ports 656, 658. For example, a pump (not shown) can be employed to continuously circulate liquid extractant from a reservoir (not shown) to and from the extractant frame 604. Once again, a desired fluid pressure of the liquid extractant through the extractant frame 604 can be maintained by an appropriate valve system (including, for example, the control valve 662), which can include a pressure gage.

As the feed solution (not shown) and the liquid extractant (not shown) are forced through the feed frame 602 and the extractant frame 604, respectively, the feed solution and the liquid extractant contact the microporous membrane 606 along the open channels 620 (FIG. 17). Due to alignment of the channels 620 of the frames 602, 604, an extraction interface is created at the microporous membrane 606, such that solute in the feed solution is transferred to the liquid extractant across the microporous membrane 606. The relatively smooth, shallow configuration of the channels 620 allows the feed solution and the liquid extractant to flow through the respective frames 602, 604 at a relatively high flow rate (e.g., on the order of at least 4 mL/sec) with minimal pressure drop. The screen 650 (FIG. 16) causes the liquid extractant to flow in a non-laminar fashion at the microporous membrane 606 interface, such that solute does not readily collect within pores of the microporous membrane 606, and the solute-bearing portion of the liquid extractant is more rapidly removed from the microporous membrane 606 surface, replaced by "fresh" liquid extractant.

Although the present invention has been described with respect to preferred embodiments, workers skilled in the art will recognize that changes can be made in form and detail without departing from the spirit and scope of the present invention. For example, the various extraction systems have preferably been described as including feed solution components and liquid extraction components; however, these components can be reversed. That is to say, with any of the above described embodiments, any chamber or frame that has been described as preferably containing/maintaining feed solution can instead contain/maintain liquid extractant, and vice-versa.

What is claimed is:

1. A method of extracting a dissolved solute from a first liquid to a second liquid, the method comprising:
providing an outer chamber;
positioning an inner chamber, including a microporous membrane sleeve internally maintaining a frame, within the outer chamber;
dispensing the first liquid into the outer chamber;
dispensing the second liquid into the inner chamber;
wherein the first liquid contacts an exterior of the microporous membrane sleeve and the second liquid contacts an interior of the microporous membrane sleeve, and wherein the microporous membrane sleeve establishes an extraction interface between the first and second liquids; and
transferring the solute from the first liquid into the second liquid across the pores of the microporous membrane sleeve;
wherein the inner chamber defines a flow region having an upper portion and a lower portion, wherein dispensing the second liquid into the inner chamber includes delivering the second liquid from a liquid source to the lower portion of the flow region, wherein dispensing the second liquid further includes filling the flow region of the inner chamber from the lower portion to the upper portion, and wherein a portion of the volume of the second liquid passes through a restricted flow fluid pathway formed in the frame during the step of filling the flow region.

2. The method of claim 1, wherein the microporous membrane sleeve includes opposing major side walls, and further wherein the first liquid contacts an exterior of both of the major side walls.

3. The method of claim 1, wherein passing a portion of the volume of the second liquid through the restricted flow fluid pathway imparts a non-laminar flow into the second liquid during the step of filling the flow region.

4. The method of claim 1, further comprising:
ceasing the step of filling the inner chamber such that a volume of the second liquid is contained within the inner chamber; and
removing a substantial portion of the volume of the second liquid from the inner chamber following a dwell period during which solute from the first liquid transfers to the second liquid.

5. The method of claim 1, further comprising:
establishing a continuous flow of the second liquid through the flow region of the inner chamber.

6. The method of claim 5, further comprising:
creating a tortuous flow path during the step of establishing a continuous flow within the inner chamber.

7. The method of claim 1, further comprising:
skimming at least one contaminant from the first liquid at a top portion of the outer chamber.

8. The method of claim 1, further comprising:
providing a plurality of inner chambers, each including a microporous membrane sleeve maintaining a frame;
positioning each of the plurality of inner chambers within the outer chamber; and
dispensing the first liquid into each of the plurality of inner chambers.

* * * * *